(12) United States Patent
Hamba

(10) Patent No.: US 7,955,565 B2
(45) Date of Patent: Jun. 7, 2011

(54) GAS-PHASE FLUIDIZED-BED REACTOR, MULTIVESSEL POLYMERIZATION REACTOR AND PROCESS FOR PRODUCING OLEFIN POLYMER

(75) Inventor: Masashi Hamba, Ichihara (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 415 days.

(21) Appl. No.: 11/920,574

(22) PCT Filed: May 16, 2006

(86) PCT No.: PCT/JP2006/309751
§ 371 (c)(1),
(2), (4) Date: Sep. 11, 2008

(87) PCT Pub. No.: WO2006/123661
PCT Pub. Date: Nov. 23, 2006

(65) Prior Publication Data
US 2009/0062586 A1    Mar. 5, 2009

(30) Foreign Application Priority Data

May 17, 2005  (JP) ................................ P2005-144319
May 16, 2006  (JP) ................................ P2006-136495

(51) Int. Cl.
*B01J 8/18*      (2006.01)
*F27B 15/00*     (2006.01)
*F27B 15/08*     (2006.01)
*C08F 2/00*      (2006.01)

(52) U.S. Cl. ........... 422/139; 422/143; 422/145; 526/72

(58) Field of Classification Search .................... 526/65; 422/139, 192, 218, 145
See application file for complete search history.

(56) References Cited

U.S. PATENT DOCUMENTS

| 6,362,290 B2 | 3/2002 | Durand et al. |
| 6,441,108 B1 | 8/2002 | Haendeler et al. |
| 6,455,643 B1 * | 9/2002 | Harlin et al. ................... 526/65 |
| 2007/0217966 A1 * | 9/2007 | Heino et al. .................. 422/143 |

FOREIGN PATENT DOCUMENTS

| JP | 59-124910 A | | 7/1984 |
| JP | 59124910 A | * | 7/1984 |
| JP | 10279612 A | | 10/1998 |
| JP | 2000-72802 A | | 3/2000 |
| JP | 2000072802 A | * | 3/2000 |
| JP | 2001-519232 A | | 10/2001 |
| WO | WO-99/19059 A1 | | 4/1999 |
| WO | WO 2005/087361 | * | 9/2005 |

* cited by examiner

*Primary Examiner* — David Wu
*Assistant Examiner* — Elizabeth Eng
(74) *Attorney, Agent, or Firm* — Birch, Stewart, Kolasch & Birch, LLP

(57) ABSTRACT

The gas-phase fluidized-bed reactor conducting reaction by feeding a gas, through a gas-distribution plate located at the lower part of a reaction vessel, into a fluidized bed formed on the gas-distribution plate, wherein the reaction vessel is made up so as to have a narrowed part at a specified position of the gas flow passage above the gas-distribution plate, and the fluidized bed is formed in the area from below the narrowed part to above the narrowed part. The gas-phase fluidized bed rector of the present invention allows manufacturing polymers having excellent homogeneity of polymer structure in gas-phase polymerization.

3 Claims, 9 Drawing Sheets

GAS-PHASE FLUIDIZED-BED REACTOR, MULTIVESSEL POLYMERIZATION REACTOR AND PROCESS FOR PRODUCING OLEFIN POLYMER

TECHNICAL FIELD

The present invention relates to a gas-phase fluidized-bed reactor, multi-vessel polymerization system, and process for producing an olefin polymer.

BACKGROUND ART

Improvement in the catalyst of olefin polymerization has enhanced a drastic increase in the production capability of olefin polymers in recent years, and the operation to remove the catalyst after polymerization can be eliminated. When applying that type of high activity catalyst, gas-phase olefin polymerization is commonly applied from the standpoint of simple operation after the polymerization.

That type of gas-phase polymerization widely adopts a gas-phase fluidized-bed reactor utilizing gas-solid fluidized bed. The gas-phase fluidized-bed reactor usually has a plate having a large number of holes, (hereinafter referred to as the "gas-distribution plate"), at the lower part of the reaction vessel. The raw material gas enters the reaction vessel through the gas-distribution plate to conduct the polymerization reaction in the fluidized bed to which the polymerization catalyst is introduced. The olefin is polymerized in the presence of the polymerization catalyst to generate the olefin polymer peripheral to the polymerization catalyst, and the olefin polymer particles are formed. Thus formed olefin polymer particles are then withdrawn from the withdrawal port located at the lower part of the reaction vessel.

A common reaction vessel for the above gas-phase fluidized-bed reactor is a vertical reaction vessel having a right circular cylindrical shape. Alternatively, there is a known reaction vessel, having a structure of gradually increasing inner diameter thereof in an ascending direction, for the purpose of preventing scattering of the olefin polymer particles from the fluidized bed against the inner walls at the upper part of the reaction vessel (for example, refer to Patent Document 1).

[Patent Document 1] Japanese Patent Application Laid-open No. 10-279612

DISCLOSURE OF THE INVENTION

Problems to be Solved by the Invention

According to a conventional gas-phase fluidized-bed reactor having the above-described reaction vessel, however, there appears, in the fluidized bed, a mixed state of the olefin polymer particles which are not fully grown and the olefin polymer particles which are fully grown. Consequently, particularly in the case of continuous gas-phase polymerization, there likely occurs a phenomenon that the ungrown olefin polymer particles are discharged from the reaction vessel together with the target of fully grown olefin polymer particles, (hereinafter the phenomenon is referred to as the "short path").

That is, in a conventional reaction vessel, the gas introduced from the gas-distribution plate at bottom thereof suspends the polymer particles. Generally the gas becomes bubbles, and the bubbles tend to repeat coalescence thereof to grow, and tend to get together to the central part of the fluidized bed, (toward the axis of the reaction vessel), and thus tend ascend therethrough. As a result, there is created a convection flow of ascending polymer particles in the central part and descending polymer particles along the inner wall surface. The fully grown polymer particles and the ungrown polymer particles are homogeneously mixed together by the convection flow, and the ungrown polymer particles are discharged from the discharge port even when the discharge port is located at bottom of the reaction vessel.

Thus obtained the olefin polymer may lose homogeneity in the polymer structure caused by changes in the activity of polymerization catalyst over time, or by other variables, and may fail to exhibit the inherent performance of the polymerization catalyst to the fullest extent.

The present invention has been completed according to the above situations, and an object of the present invention is to provide a gas-phase fluidized-bed reactor, multi-vessel polymerization system, and process for producing an olefin polymer, which allow to produce polymers having excellent homogeneity of polymer structure in gas-phase polymerization.

Method to Solve the Problems

The present invention provides a gas-phase fluidized-bed reactor conducting reaction by feeding a gas, through a gas-distribution plate located at the lower part of a reaction vessel, into a fluidized bed formed on the gas-distribution plate, wherein the reaction vessel is made up so as the gas flow passage above the gas-distribution plate has a narrowed part at a specified position, and the fluidized bed is formed in an area from below to above the narrowed part. The gas-phase fluidized-bed reactor is hereinafter referred to as the "first reactor" for convenience of description.

The term "narrowed part" referred to herein is defined as, when the area above the gas-distribution plate in the reaction vessel is viewed upward in the vertical direction to the gas-distribution plate, the part giving the minimum cross sectional area in the cross sectional areas of gas flow passage parallel to the gas-distribution plate, (hereinafter referred also to simply as the "cross sectional area"), in the area where the cross sectional area monotonously decreases and then monotonously increases. The cross sectional area of the gas flow passage may monotonously decrease and then immediately monotonously increase, or may monotonously decrease, followed by maintaining the state, and then monotonously increase. In the former case, the part of the boundary with the monotonously decreasing area is the narrowed part. In the latter case, the part of the area maintaining the minimum cross sectional area is the narrowed part. The number of the narrowed parts in the gas flow passage may be one or more. Furthermore, when the gas flow passage has plurality of narrowed parts, the magnitude of the cross sectional area of individual narrowed parts is not specifically limited.

The reaction vessel in the first reactor is made up, as described above, so as the gas flow passage above the gas-distribution plate to have a narrowed part at a specified position. Since the area below the narrowed part is formed so that the gas flow passage tapers off along the gas inflow direction, the gas that entered from the gas-distribution plate ascends at a sufficient velocity not only at the central part of the fluidized bed, (the zone distant from the inner walls), but also in the vicinity of the inner walls, and the gas flow allows the particles in the fluidized bed, (hereinafter referred to as the "fluidizing particles"), selecting smaller mass fluidizing particles to suspend at upper layer of the fluidized bed.

In the zone above the narrowed part, the gas flow passage is formed so that it becomes wider along the gas inflow direction. Within this zone, however, convection flow is generated by the fluidizing particles ascending at central part of the fluidized bed and the fluidizing particles descending along the inner wall surface, and the convection flow allows the smaller mass fluidizing particles to retain homogeneously and stably in the area above the narrowed part.

When gas-phase polymerization is conducted in the first reactor, since the particles consisting mainly of polymerization catalyst in the fluidization particles are initially small mass particles, they stay in the zone above the narrowed part. With the progress of the gas-phase polymerization, the polymer, (an olefin polymer for the case that the gas is the olefin), is formed peripheral to the polymerization catalyst, and thus the mass of the fluidizing particles increases.

With the increase in the mass of the fluidizing particles with the progress of the gas-phase polymerization, the fluidizing particles descend to move into the zone below the narrowed part. However, since the zone below the narrowed part is prevented from generating convection flow of the fluidizing particles, segregation of the fluidizing particles likely occurs, thus the fully grown fluidizing particles can selectively be withdrawn from lower part of the reaction vessel.

As described above, the first reactor allows to obtain stably the polymer having excellent homogeneity of polymer structure in gas-phase polymerization.

In the first reactor, preferably the reaction vessel is in a narrowed annular shape, the gas-distribution plate is in a circular disk shape, and the reaction vessel and the gas-distribution plate are coaxially arranged. The term "narrowed annular shape" referred to herein signifies the shape in annular shape and being narrowed at a specified position so as the gas flow passage to have a narrowed part. The "narrowed annular shape" includes a shape what is called the "hour-glass shape".

If the reaction vessel is in a narrowed annular shape, fluidizing particles having smaller mass can be suspended in upper layer of the fluidized bed by letting the fluidizing particles in the vicinity of the inner wall surface of the reaction vessel stably suspend in the zone blow the narrowed part, and further the fluidizing particles having smaller mass can be more homogeneously and stably retained in the zone above the narrowed part.

The present invention provides a gas-phase fluidized-bed reactor conducting reaction by feeding a gas, through a gas-distribution plate located at the lower part of a reaction vessel, into a fluidized bed formed on the gas-distribution plate, wherein the reaction vessel has a narrowed part member to provide the gas flow passage above the gas-distribution plate with a narrowed part at a specified position, and the fluidized bed is formed in area from below the narrowed part to above the narrowed part. The gas-phase fluidized-bed reactor is hereinafter referred to as the "second reactor" for convenience of description.

The second reactor differs from the first reactor which has a gas flow passage having a narrowed part formed by the reaction vessel, in that the second reactor has a narrowed part member to provide the gas flow passage above the gas-distribution plate with the narrowed part at a specified position. However, both reactors have the same shape of gas flow passage in that the zone below the narrowed part is formed so that gas flow passage tapers off along its inflow direction and that the zone above the narrowed part is formed so that that gas flow passage becomes wider along the gas inflow direction.

Consequently, also in the second reactor, at the zone below the narrowed part, the gas entering from the gas-distribution plate ascends at a sufficient velocity not only in the central part of the fluidized bed but also in the vicinity of the inner wall surface, and therefore the gas flow allows the fluidizing particles to stably suspend.

Furthermore, also in the second reactor, convection flow is generated in the zone above the narrowed part by the fluidizing particles ascending in the central part and the fluidizing particles descending along the inner wall surface, and this flow allows the smaller mass fluidizing particles to homogeneously and stably retain in the zone above the narrowed part.

Also in the second reactor, with the increase in the mass of the fluidizing particles with the progress of the gas-phase polymerization, the fluidizing particles descend to move into the zone below the narrowed part. However, since convection flow of the fluidizing particles is suppressed at the area below the narrowed part, segregation of the fluidizing particles likely occurs, thus the fully grown fluidizing particles can selectively be withdrawn from lower part of the reaction vessel.

As described above, the second reactor allows to obtain stably a polymer having excellent homogeneity of polymer structure in the gas-phase polymerization.

Since the narrowed part member can be readily attached and detached, the existing cylindrical type can be used as a reaction vessel and the position of the narrowed part member can be adjusted depending on the structure of the reaction vessel, the gas entering velocity, and the like.

In the gas-phase fluidized-bed reactor, it is preferable that the narrowed part member is in a narrowed annular shape, the gas-distribution plate is in a circular disk shape, and the narrowed part member and the gas-distribution plate are coaxially arranged.

By suspending stably the fluidizing particles existing near the inner wall surface of the reaction vessel in the zone below the narrowed part, the fluidizing particles having smaller mass can be suspended in the upper layer of the fluidized bed, and the fluidizing particles having smaller mass can further be homogeneously and stably retained in the zone above the narrowed part.

Accordingly, the above gas-phase fluidized-bed reactor allows the fluidizing particles to satisfactorily suspend by the gas introduced from the gas-distribution plate, thereby allowing the particles having smaller mass to retain further homogeneously and stably in the gas flow passage above the narrowed part, while allowing the particles having larger mass to retain further stably in the gas flow passage below the narrowed part.

Both of above first and second reactors can retain particles having smaller mass among the fluidizing particles homogeneously and stably in the gas flow passage mainly above the narrowed part, and can retain particles having larger mass among the fluidizing particles stably in the gas flow passage mainly below the narrowed part. As a result, those reactors are favorably applied to reactions in which the fluidizing particles change their mass, for example: the gas-phase polymerization such as olefin polymerization in which the mass of fluidizing particles increases with the progress of reaction; and the gas-solid reaction accompanying mass changes of particles forming the fluidized bed, including the coal gasification reaction and the waste incineration reaction, in which the mass of the fluidizing particles decreases with the progress of reaction. Those reactors are more preferably applied to the gas-phase polymerization reaction, in particular the reaction conducting gas-phase polymerization by introducing the reaction gas into the fluidized bed through the gas-distribution plate on which the fluidized bed is formed. In these reactions, these reactors are specifically preferred to be used in a continuous reaction.

In the case of these first and second reactors, when the reaction is conducted by introducing small mass particles to the reaction vessel, and when the large mass particles are withdrawn from the reaction vessel, it is preferable that the introduction port is located between the narrowed part of the gas flow passage and the upper face of the fluidized bed, and that the withdrawal port is located below the narrowed part in the gas flow passage. When the reaction is conducted by introducing the large mass particles to the reaction vessel and withdrawing the small mass particles from the reaction vessel, it is preferable that the introduction port is located below the narrowed part in the gas flow passage, and that the withdrawal port is located between the narrowed part in the gas flow passage and the upper face of the fluidized bed.

When gas-phase polymerization reaction is conducted using the above first and second reactors, it is preferable that both of these reactors have introduction port that introduces the polymerization catalyst to the reaction vessel at a position between the narrowed part in the gas flow passage and the upper face of the fluidized bed, and the withdrawal port that withdraws the polymer generated by the gas-phase polymerization of the reaction gas at a position below the narrowed part in the gas flow passage.

In the case of gas-phase polymerization reaction, since the introduction port that introduces the polymerization catalyst is located above the narrowed part, the falling-down of small mass fluidizing particles such as the introduced polymerization catalyst and ungrown polymer particles to the lower part of the fluidized bed can further be suppressed. The effect can further surely suppress the short path in the first and second reactors, and can efficiently and fully grow the fluidizing particles, thereby being able to produce a polymer which has excellent homogeneity in the polymer structure. Furthermore, the introduced polymerization catalyst can fully be functioned. In addition, since the withdrawal port is positioned below the narrowed part, the fully grown fluidizing particles can easily and surely withdrawn from the withdrawal port.

The present invention provides a multi-vessel polymerization system having plurality of reactors, which contain one or more of the above first and second reactors.

A preferred example of the multi-vessel polymerization system according to the present invention is the one comprising at least one reactor selected from the group consisting of a bulk polymerization reactor, a slurry polymerization reactor, and a circular cylindrical gas-phase fluidized-bed reactor, at the upstream side of the first or second reactor, and a circular cylindrical gas-phase fluidized-bed reactor being at the downstream side of the first or second reactor.

The present invention provides both the first and second reactors or any of the first and second reactors, or process for producing an olefin polymer through the use of the multi-vessel polymerization system according to the present invention, having both the first and second reactors or any of the first and second reactors wherein the reaction gas is introduced into the fluidized bed through the gas-distribution plate so as the upper face of the fluidized bed to be above the narrowed part in the first or second reactors, thereby obtaining the olefin polymer by gas-phase polymerization of the reaction gas.

According to the process for producing an olefin polymer of the present invention, the gas introduced from the gas-distribution plate ascends along the inner wall surface of the reaction vessel below the narrowed part in the gas flow passage in the first or second reactor, thereby allowing the fluidizing particles to stably suspend not only in the central part of the fluidized bed, (the zone distant from the inner wall surface), but also in the vicinity of the inner wall surface. At above the narrowed part of the gas flow passage, since the upper face of the fluidized bed is above the narrowed part, and since the gas pushes up the particles in the central part of the fluidized bed, the fluidizing particles mainly in the peripheral zone of the central part generate convection flow toward the outer side of the fluidized bed. The fully grown fluidizing particles then fall down with increasing mass thereof, and are withdrawn from the withdrawal port. As a result, through the above process for producing an olefin polymer according to the present invention, the fluidizing particles can be efficiently and fully grown while suppressing short path, thereby allowing to producing the olefin polymer having excellent homogeneity of polymer structure.

The above process for producing an olefin polymer according to the present invention preferably uses the reaction gas containing at least one or more kinds of olefin gases to obtain the olefin polymer by the gas-phase polymerization of the reaction gas.

When a single olefin gas is used as reaction gas, there can be produced an olefin homopolymer which has further improved homogeneity of polymer structure. When the reaction gas contains two or more kinds of olefin gases, there can be produced an olefin copolymer which has further improved homogeneity of polymer structure.

EFFECT OF THE INVENTION

When conducting gas-phase polymerization, the present invention can provide a gas-phase fluidized-bed reactor which can make it possible to produce a polymer having excellent homogeneity of polymer structure, a multi-vessel polymerization system having the gas-phase fluidized-bed reactor, and a process for producing a polyolefin polymer.

DESCRIPTION OF THE REFERENCE SYMBOLS

Figure 1:
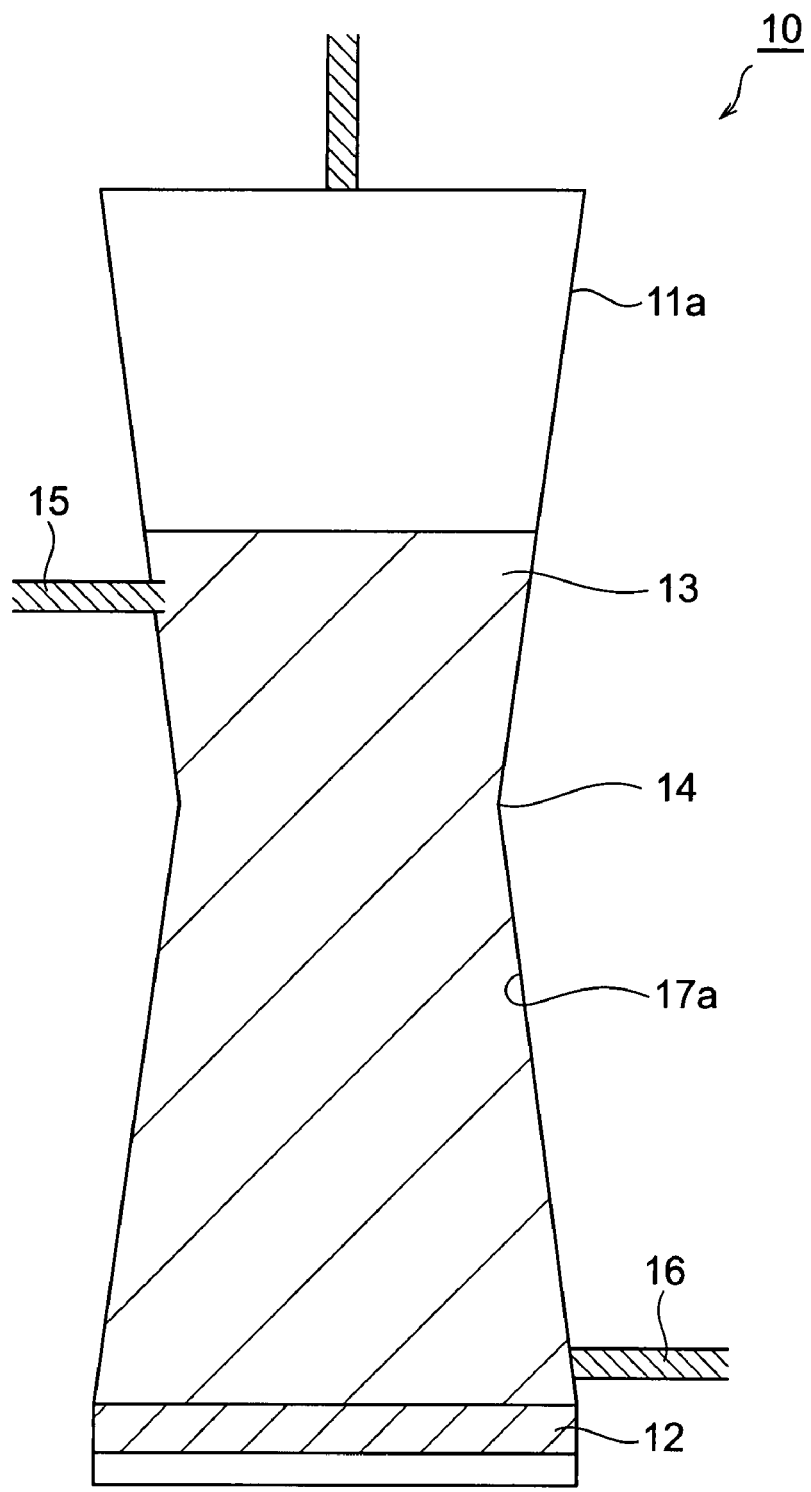
FIG. 1 is a schematic sectional view illustrating the first embodiment of the gas-phase fluidized-bed reactor according to the present invention.

10, 20: gas-phase fluidized-bed reactor
11*a*, *b*: reaction vessel

12: gas-distribution plate
13: fluidized bed
14: narrowed part
14a: narrowed part member
15: introduction port
16: withdrawal port
17a, b: inner wall
100: multi-vessel polymerization system

BEST MODES FOR CARRYING OUT THE INVENTION

Preferred embodiments for the present invention are described below in detail referring to, if required, the drawings. The same element in these drawings has the same reference symbol, and no overlapping description is given. The dimensional ratios in these drawings are not necessarily limited to the ratios given in these drawings.

First Embodiment

The description begins with a gas-phase fluidized-bed reactor 10 in the first embodiment according to the present invention, (the first reactor).

FIG. 1 is a schematic sectional view illustrating the gas-phase fluidized-bed reactor 10 in the first embodiment according to the present invention. FIG. 1 shows a cross section of the gas-phase fluidized-bed reactor in a plane containing the rotation axis of the gas-distribution plate and of the reaction vessel, and in vertical direction to the gas-distribution plate. As shown in FIG. 1, the gas-phase fluidized-bed reactor 10 according to the embodiment has a reaction vessel 11a, a gas-distribution plate 12 located at the lower part of the reaction vessel, and a fluidized bed 13, formed above the distribution plate 12 in the reaction vessel 11a and composed of fluidizing particles. The reaction vessel 11a is made up so as the gas flow passage above the gas-distribution plate 12 to have a narrowed part 14 at a specified position. The fluidized bed 13 is formed in an area from below to above the narrowed part 14.

In the gas-phase fluidized-bed reactor 10 according to the first embodiment, the gas that enters the gas-phase fluidized-bed reactor 10 from the inflow port (not shown) is uniformly distributed in the plane directions of the gas-distribution plate 12 before entering the reaction vessel. Since the reaction vessel 11a is designed so as the gas flow passage above the gas-distribution plate 12 to have the narrowed part 14 at a specified position, the gas entering from the gas-distribution plate 12 ascends, in the reaction vessel 11a below the narrowed part 14, also along the surface of the inner wall 17a of the reaction vessel 11a, thereby allowing the fluidizing particles to stably suspend not only at the central part of the fluidized bed 13, (the zone distant from the inner wall surface), but also in the vicinity of the inner wall 17a.

Since the upper face of the fluidized bed 13 is above the narrowed part 14, the gas collected to the narrowed part 14 in the gas flow passage after repeated consolidation of bubbles ascends the central part of the fluidized bed 13 without re-distributing above the narrowed part. Consequently, above the narrowed part 14 in the gas flow passage, as the gas pushes up mainly the particles in central part of the fluidized bed, the convection flow of the fluidizing particles peripheral to the central part is generated from the central part of the fluidized bed toward outer zone of the fluidized bed. As a result, the small mass particles among the fluidizing particles can be retained further homogeneously and stably above the narrowed part 14 in the gas flow passage.

The unreacted gas passes through the fluidized bed 13, and is discharged from a vent pipe attached to the upper part of the reaction vessel. The discharged gas can be reused by recirculating to the inflow port.

In the case of gas-phase polymerization reaction, the gas-phase fluidized-bed reactor 10 in the first embodiment can fully grow the fluidizing particles which form the fluidized bed, and the fully grown fluidizing particles flow down by increasing in their mass, and then are withdrawn from the withdrawal port. As a result, the fluidizing particles can be efficiently and fully grown while suppressing the short path, thereby being able to produce a polymer which has excellent homogeneity in the polymer structure.

The following is further detail description of individual parts.

(Gas-Distribution Plate)

The gas-distribution plate 12 adopted in the present embodiment has a structure of a flat plate having plurality of throughholes, through which holes gas passes from one end of the plate to the other end thereof. The number and the positions of the throughholes are not specifically limited. The position of the gas-distribution plate is lower part of the reaction vessel so that the gas entering from the inflow port ascends passing through the gas-distribution plate. The gas-distribution plate may have caps or the like on the holes to prevent falling down of powder therethrough or to give a specific ejection direction of the gas.

The gas-distribution plate allows the gas to distribute in the plane directions of the gas-distribution plate 12. Since, accordingly, the distributed gas can enter the fluidized bed over wider area, small mass particles among the fluidizing particles can be retained more homogeneously and stably above the narrowed part in the gas flow passage, and large mass particles among the fluidizing particles can be retained more stably mainly below the narrowed part in the gas flow passage.

(Reaction Vessel)

The reaction vessel 11a in the present embodiment has a vertical and continuous inner structure, and the gas-distribution plate is positioned at the lower part thereof.

The gas flow passage is formed inside the reaction vessel 11a, and has the narrowed part 14. At least one narrowed part 14 is required in the gas flow passage.

FIGS. 2(a) to (g) are schematic sectional views illustrating examples of the reaction vessel of the gas-phase fluidized-bed reactor according to the present invention. The cross section illustrates the gas-phase fluidized-bed reactor in a plane containing rotation axis of the gas-distribution plate and of reaction vessel, and in vertical direction to the gas-distribution plate. All of these reaction vessels are in a narrowed annular shape, and are made up so that the gas flow passage has a narrowed part at a specified position above the gas-distribution plate.

Figure 2:
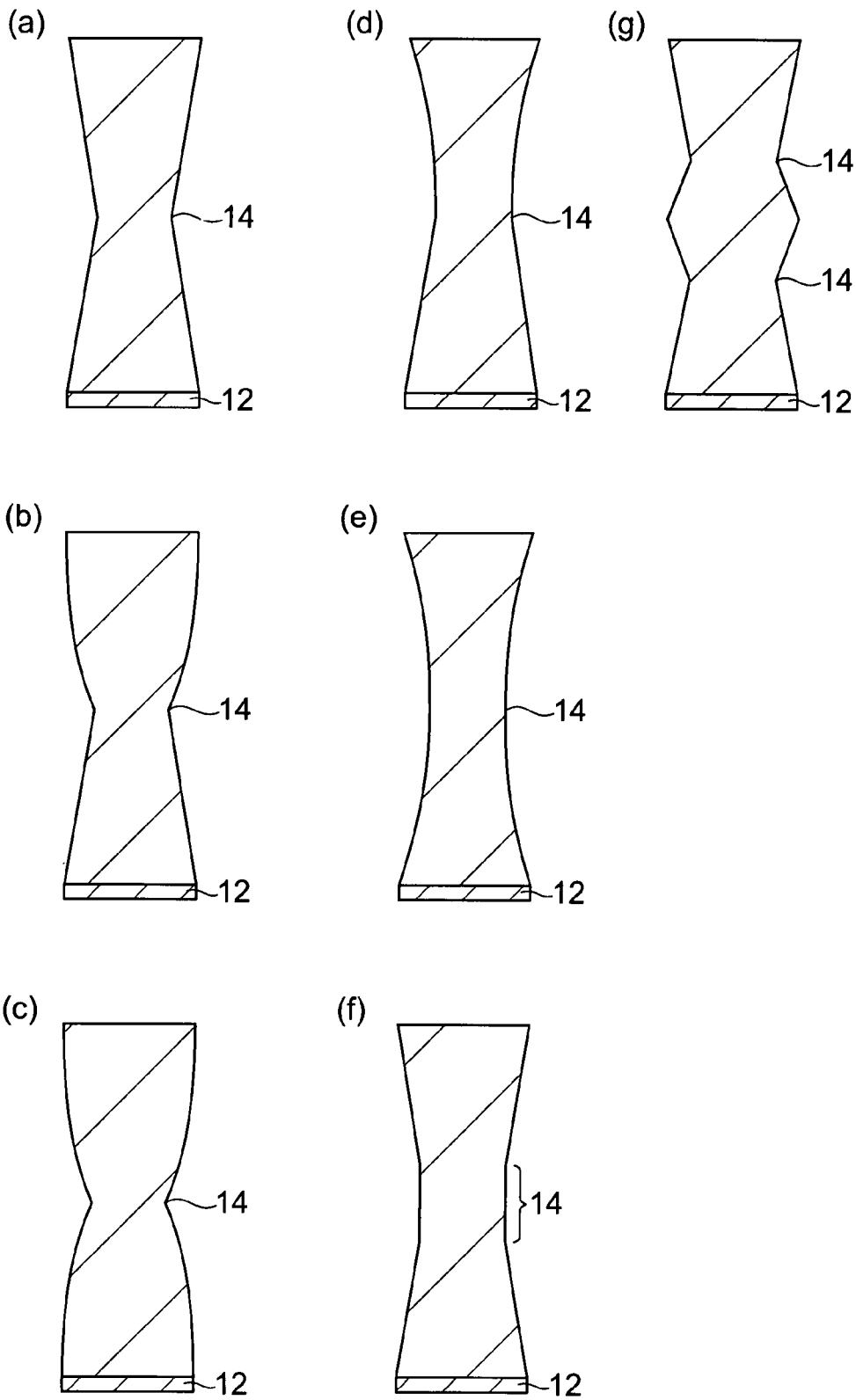
FIGS. 2(a) to (g) are schematic sectional views illustrating examples of reaction vessel of the gas-phase fluidized-bed reactor according to the present invention.

That is, when the zone above the gas-distribution plate 12 in the reaction vessel is viewed upward in the vertical direction to the gas-distribution plate 12, the reaction vessel shown in FIG. 2(a) has a shape that the diameter of cross section of the gas flow passage, parallel to the gas-distribution plate 12, monotonously decreases, and then immediately monotonously increases, thereby creating the narrowed part 14 at a position that gives the minimum diameter of the cross section. The variation of the diameter of the cross section in both the monotonously decreasing zone and the monotonously increasing zone is constant. The reaction vessel shown in FIG. 2(b) has a shape that the diameter of cross section of the gas flow passage, parallel to the gas-distribution plate 12, monotonously decreases, and then immediately monotonously increases, thereby creating the narrowed part 14 at a position that gives the minimum diameter of the cross section. Although the variation of the diameter of the cross section in the monotonously decreasing zone is constant, the variation of the diameter of the cross section in the monotonously increasing zone becomes smaller at the upper zone. The reaction vessel shown in FIG. 2(*c*) has a shape that the diameter of cross section of the gas flow passage, parallel to the gas-distribution plate 12, monotonously decreases, and then immediately monotonously increases, thereby creating the narrowed part 14 at a position that gives the minimum diameter of the cross section. The variation of the diameter of the cross section in the monotonously decreasing zone becomes larger at upper zone, and the variation of the diameter of the cross section in the monotonously increasing zone becomes smaller at the upper zone. The reaction vessel shown in FIG. 2(*d*) has a shape that the diameter of cross section of the gas flow passage, parallel to the gas-distribution plate 12, monotonously decreases, and then immediately monotonously increases, thereby creating the narrowed part 14 at a position that gives the minimum diameter of the cross section. Although the variation of the diameter of the cross section in the monotonously decreasing zone is constant, the variation of the diameter of the cross section in the monotonously increasing zone becomes larger at upper zone. The reaction vessel shown in FIG. 2(*e*) has a shape that the diameter of cross section of the gas flow passage, parallel to the gas-distribution plate 12, monotonously decreases, and then immediately monotonously increases, thereby creating the narrowed part 14 at a position that gives the minimum diameter of the cross section. The variation of the diameter of the cross section in the monotonously decreasing zone becomes smaller at upper zone, and the variation of the diameter of the cross section in the monotonously increasing zone becomes larger at upper zone. The reaction vessel shown in FIG. 2(*f*) has a shape that the diameter of cross section of the gas flow passage, parallel to the gas-distribution plate 12, monotonously decreases, followed by keeping the minimum diameter in some distance, and then monotonously increases. The portion where the minimum diameter is kept becomes the narrowed part 14. The variation of the diameter of the cross section in both the monotonously decreasing zone and the monotonously increasing zone is constant. The reaction vessel shown in FIG. 2(*g*) has a shape that two of the reaction vessel shown in FIG. 2(*a*) connect together in the axial direction, thus forming a gas flow passage which has two narrowed parts 14.

The reaction vessel 11*a* is preferably in a narrowed annular shape. With the structure, the gas entering from the gas-distribution plate 12 can retain the small mass particles among the fluidizing particles mainly above the narrowed part in the gas flow passage further homogeneously and stably, and can retain the large mass particles among the fluidizing particles mainly below the narrowed part in the gas flow passage further stably.

One or more narrowed part 14 can be positioned in the gas flow direction in the gas flow passage, or in the upstream and downstream directions in the gas flow passage. When plurality of narrowed parts 14 are positioned, the upper face of the fluidized bed is only required to be positioned above the lowest narrowed part 14.

According to the present embodiment, since the reaction vessel 11*a* is structured so as the gas flow passage above the gas-distribution plate 12 to have a narrowed part at a specified position, the gas entering from the gas-distribution plate 12 ascends also along the inner wall 17*a* of the reaction vessel 11*a* in the gas flow passage below the narrowed part 14, thereby allowing the fluidizing particles to stably suspend not only in the central part of the fluidized bed, (the zone distant from inner wall), but also in the vicinity of the inner wall 17*a*.

The fluidized bed is formed in the gas flow passage. The fluidized bed is formed in an area from below the narrowed part 14 to above the narrowed part 14. In the area above the narrowed part 14 in the gas flow passage, since the gas pushes up mainly the fluidizing particles in the central part of the fluidized bed, the fluidizing particles peripheral to the central part generate convection flow from the central part toward outer area therefrom. As a result, in the case of gas-phase polymerization, small mass fluidizing particles such as the introduced polymerization catalyst and the polymer particles not fully grown can be retained above the narrowed part 14 further homogeneously and stably, and the fluidizing particles can efficiently and fully be grown.

The fluidized bed is composed of fluidizing particles. The fluidizing particles are composed of, in the case of gas-phase polymerization, the polymerization catalyst and the polymer particles obtained by polymerizing the reaction gas using the polymerization catalyst. Detail of the fluidizing particles is described later.

The gas-distribution plate 12 is preferably in a circular disk shape, and the reaction vessel 11*a* and the gas-distribution plate 12 are preferably positioned coaxially with each other. When the gas flow passage is in the above-described state, the gas entering from the gas-distribution plate can retain the small mass particles among the fluidizing particles mainly above the narrowed part in the gas flow passage further homogeneously and stably, and can retain the large mass particles among the fluidizing particles mainly below the narrowed part in the gas flow passage further stably. Also from the standpoint of construction of the reactor, the above arrangement is preferred.

The inner diameter of the gas-distribution plate 12 and the inner diameter of the reaction vessel 11*a* at the bottom thereof are preferably almost the same each other. In other words, the reaction vessel and the gas-distribution plate are preferably designed so as the gas passed through the gas-distribution plate 12 to uniformly diffuse over the inside of the reaction vessel.

As illustrated in FIG. 1, when the reaction vessel 11*a* in the present embodiment is used as a polymerization reaction vessel, the reaction vessel 11*a* has a introduction port 15 to introduce the polymerization catalyst thereto, and a withdrawal port 16 to withdraw the fluidizing particles generated by the gas-phase polymerization of the reaction gas therefrom.

In the case of olefin polymerization reaction, for example, the polymerization catalyst or the preliminary polymerization catalyst introduced from the introduction port 15 initiates the polymerization reaction through the olefin gas entering the fluidized bed via the gas-distribution plate, thus generating the olefin polymer at periphery of the polymerization catalyst or the preliminary polymerization catalyst to form the olefin polymer particles (fluidizing particles). Then, the olefin polymer particles grow through the polymerization reaction, and the fully grown polymer particles are withdrawn from the reaction vessel via the withdrawal port 16 at the bottom thereof.

The introduction port 15 is preferably positioned between the narrowed part 14 and the upper face of the fluidized bed, and the withdrawal port 16 is preferably positioned below the narrowed part 14.

Since the introduction port 15 to introduce the polymerization catalyst is positioned above the narrowed part, the small mass fluidizing particles such as the introduced polymerization catalyst and the polymer particles not fully grown can be prevented from falling down to lower part of the fluidized bed. As a result, the gas-phase fluidized-bed reactor in the present embodiment can further surely prevent the short path, and the introduced polymerization catalyst can fully be functioned. In addition, since the withdrawal port 16 is positioned below the narrowed part 14, the fully grown fluidizing particles can readily and surely be withdrawn from the withdrawal port 16.

A preferable cross sectional area of the gas flow passage at the narrowed part is 0.1 to 0.95 times the cross sectional area of the gas flow passage at the lowermost face (at the position of gas-distribution plate 12) in the reaction vessel 11a, more preferably 0.2 to 0.8 times, and most preferably 0.3 to 0.6 times. If the cross sectional area of the gas passage at that position is below 0.1 times the cross sectional area of the gas flow passage at the lowermost face of the reaction vessel 11a, the gas velocity at the narrowed part becomes excessively large compared with the case that the cross sectional area is in the above area, which may significantly increase the scattering of fluidizing particles outside the reaction vessel. If the cross sectional area thereof exceeds 0.95 times, the homogeneous mixing of the fluidizing particles in the fluidized bed is enhanced compared with the case that the cross sectional area is in the above range, which may likely cause short path.

On the condition that the height from the gas-distribution plate to the upper face of the fluidized bed (the height of the fluidized bed), is expressed by H, the narrowed part (the lowermost narrowed part in case of existence of plurality of narrowed parts), is preferably in the range of 0.1H to 0.9H from the gas-distribution plate, more preferably 0.3H to 0.8H therefrom, and most preferably 0.3H to 0.7H therefrom. If the narrowed part is positioned at a height below 0.1H from the gas-distribution plate, or at a height of 0.9H or more therefrom, short path may likely be caused.

(Fluidizing Particles)

The fluidizing particles in the embodiment are the polymerization catalyst and the polymer particles which are prepared, in the case of gas-phase polymerization, by polymerizing the reaction gas in the presence of polymerization catalyst. The polymerization catalyst used in the present embodiment includes a heretofore known olefin polymerization catalyst such as: heterogeneous polymerization catalyst which includes polymerization catalyst, containing titanium, magnesium, halogen, and electron donor; and homogeneous catalyst which generates a polymer having almost single melting point. The homogeneous catalyst includes a polymerization catalyst prepared by supporting a co-catalyst such as metallocene complex composed of a transition metal such as titanium and zirconium, and methyl aluminoxane on a porous silica.

The mass mean particle size of the polymerization catalyst is in the range of 5 to 150 μm, and from the standpoint of decreasing the scattering of polymerization catalyst outside the reaction vessel, the range is preferably 10 μm or more, and more preferably 15 μm or more.

A co-catalyst, an organic aluminum compound, an activator, or an organic silicon compound may be used together with the above catalyst. Typical co-catalysts and activators are known, and applicable ones are disclosed, for example, in U.S. Pat. No. 4,405,495 and U.S. Pat. No. 4,508,842. Furthermore, the polymerization catalyst in the present embodiment may contain additives such as a fluidization promoter and an antistatic agent. The polymerization catalyst in the present embodiment can be used in combination with a chain-transfer agent such as hydrogen to adjust the molecular weight of the polymer.

The polymerization catalyst may be what is called the "preliminary polymerization catalyst" prepared by polymerizing a polymerization catalyst with a small amount of olefin. An applicable olefin in the preliminary polymerization includes an olefin used in the above gas-phase polymerization. In this case, a single olefin or two or more of olefins may be used.

The method for producing the preliminary polymerization catalyst is not specifically limited, and there can be referred to slurry polymerization, gas-phase polymerization, and the like. As of these, slurry polymerization is preferred because of economical producing in some cases. Any of batchwise, semi-batchwise, and continuous polymerizations can be applied.

The mass mean particle size of the preliminary polymerization catalyst is in the range of 5 to 1000 μm, and from the standpoint of decreasing the scattering of polymerization catalyst outside the reaction vessel, the range is preferably 10 μm or more, and more preferably 15 μm or more. As of the preliminary polymerization catalyst, less existence of the ones having 20 μm or less particle size, specifically 10 μm or less particle size, are preferable.

The introduction of polymerization catalyst may be conducted by suspending the catalyst in a hydrocarbon solvent or the like, or may be given accompanied with monomer gas or inert gas such as nitrogen gas.

The reaction gas applied in the embodiment is not specifically limited, and examples of the gas are an olefin such as an α-olefin, polar vinyl monomer, diene, and acetylene. As of these, an olefin is preferred. An olefin is suitable for the gas-phase polymerization reaction. Applicable olefins include $C_2$ or a higher linear olefin and a cyclic olefin. Examples of these olefins are ethylene, propylene, 1-butene, 1-pentene, 1-hexene, 1-octene, 1-decene, 3-methyl-1-pentene, 4-methyl-1-pentene, cyclopentene, and cyclohexene. As of these, preferred ones are ethylene, propylene, 1-butene, 1-hexene, 1-octene, and 4-methyl-1-pentene, and more preferable ones are ethylene, propylene, and 1-butene.

One of these compounds may be polymerized to produce a homopolymer, or two or more of them may be polymerized to produce a copolymer. Alternatively, one of these compounds may be polymerized to obtain a homopolymer, followed by polymerizing two or more of them to produce a block copolymer.

The gas-phase polymerization using the gas-phase fluidized-bed reactor in the present embodiment is preferably conducted in an environment substantially free from water. If water exists, the activity of the polymerization catalyst may deteriorate. If oxygen and carbon dioxide exist in the polymerization reaction system, the activity of polymerization catalyst may deteriorate.

The reaction temperature is preferably in the range of 0° C. to 120° C., and more preferably 20° C. to 100° C. If the reaction temperature is below 0° C., the activity of polymerization catalyst may deteriorate, and if the reaction temperature exceeds 120° C., the flowability of the fluidizing particles in the fluidized bed may deteriorate.

The reaction pressure is preferably in the range of normal pressure to 10 MPa, and more preferably 0.2 to 8.0 MPa. If the reaction pressure is below normal pressure, the productivity may deteriorate, and if the reaction pressure exceeds 10 MPa, the cost of reactor may increase.

The gas velocity in the fluidize bed reactor during gas-phase polymerization is preferably in the range of 5 to 150 cm/s, and more preferably 10 to 100 cm/s. If the gas velocity is smaller than 5 cm/s, the flowability of the fluidizing particles in the fluidized bed may deteriorate to form lumps of fluidizing particles, and if the gas velocity exceeds 150 cm/s, scattering of fluidizing particles outside the reaction vessel may increase and short path may likely be caused.

When the minimum fluidization velocity under the polymerization condition is defined as $V_{min}$ (cm/s), the gas velocity in the fluidized-bed reactor is preferably in the range of $V_{min}$ or more to below ($V_{min}$+20 cm/s), and more preferably ($V_{min}$+2 cm/s) or more to below ($V_{min}$+10 cm/s). If the gas velocity in the fluidized-bed reactor is outside the above range, the flowability of fluidizing particles in the fluidized bed may excessively deteriorate or likely induce short pass caused by excessively large gas velocity.

The term "minimum fluidization velocity (also called the "incipient fluidization velocity") $V_{min}$" is defined as follows. In a fluidized bed, the gas velocity is increased to a fluidizing state, and then is gradually decreased to determine the dependency of the pressure drop across the fluidized bed on the gas velocity. The pressure drop across the fluidized bed and the gas velocity are plotted to draw a line. The gas velocity at a flexion point is defined as the minimum fluidization velocity, (Iwao Muchi, Shigemasa Mori, and Masayuki Horio, "Reaction Engineering of Fluidized Bed", p 19). Affecting variables on the minimum fluidization velocity $V_{min}$ include particle size and bulk specific gravity of solids, and gas density and viscosity. However, the minimum fluidization velocity $V_{min}$ is independent of the cross sectional shape and cross sectional area of the fluidized bed.

Second Embodiment

The next description is the second embodiment of the present invention on a gas-phase fluidized-bed reactor 20, (the second reactor). The same or similar structural element to that of the first embodiment has the same reference symbol, and no overlapping description is given below.

Figure 3:
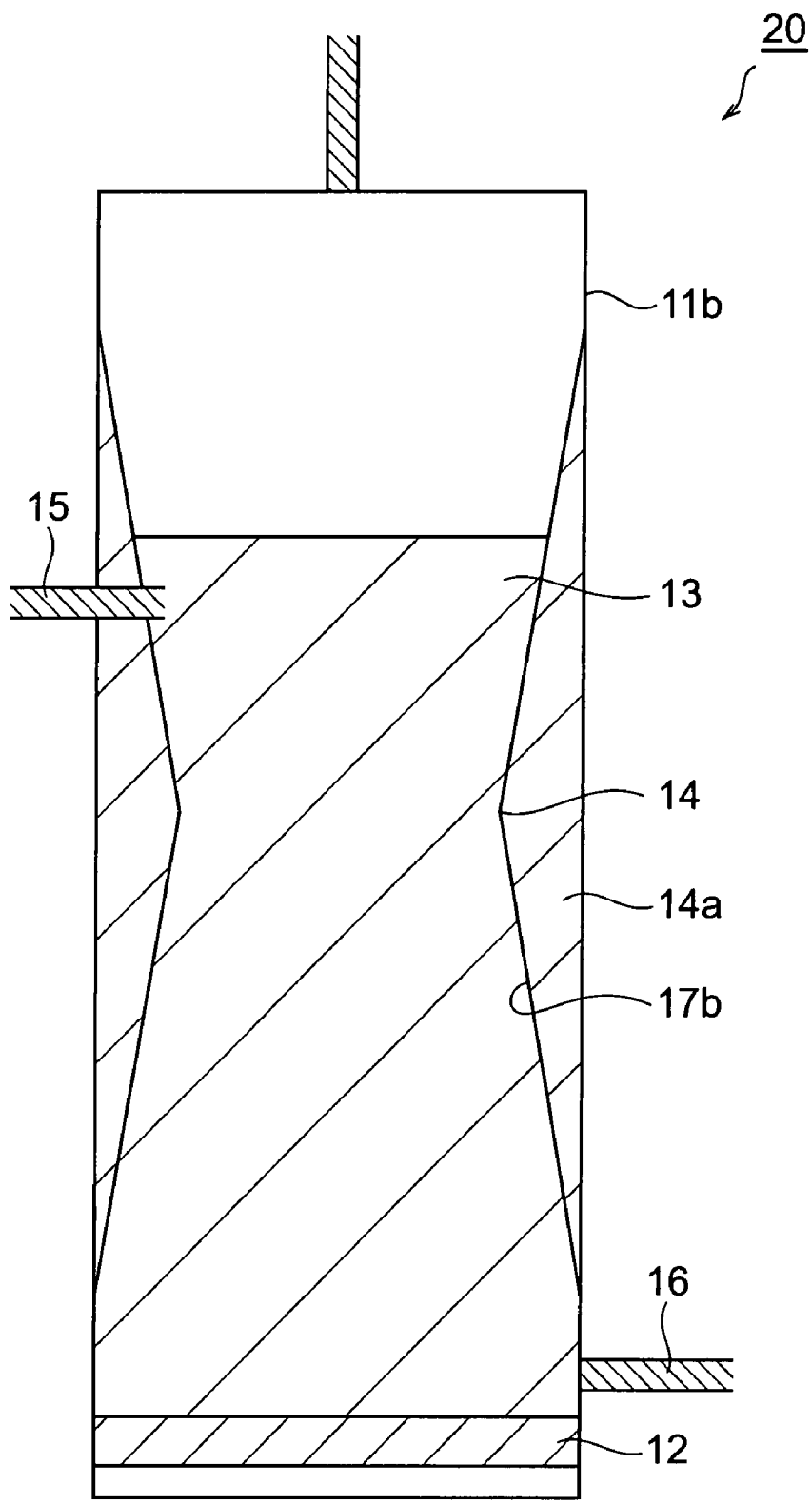
FIG. 3 is a schematic sectional view illustrating the second embodiment of the gas-phase fluidized-bed reactor according to the present invention.

FIG. 3 is a schematic sectional view illustrating the second embodiment of the gas-phase fluidized-bed reactor according to the present invention and shows a cross section of the gas-phase fluidized-bed reactor in a plane containing the rotation axis of the gas-distribution plate and of the reaction vessel, and in a vertical direction to the gas-distribution plate. As shown in FIG. 3, the gas-phase fluidized-bed reactor 20 according to the embodiment has a reaction vessel 11b, the gas-distribution plate 12 located at the lower part of the reaction vessel, and the fluidized bed 13, formed above the distribution plate 12 in the reaction vessel 11b and composed of fluidizing particles. The reaction vessel 11b has a narrowed part member 14a so as the gas flow passage above the gas-distribution plate 12 to have the narrowed part 14 at a specified position. The fluidized bed 13 is formed in the area from below to above the narrowed part 14.

In the gas-phase fluidized-bed reactor 20 according to the second embodiment, the gas entering the gas-phase fluidized-bed reactor 20 through the inflow port (not shown) is distributed in the plane directions of the gas-distribution plate 12 before entering the reaction vessel. Since the reaction vessel 11b is designed to have the narrowed part member 14a so as the gas flow passage above the gas-distribution plate 12 to have the narrowed part 14 at a specified position, the gas entering from the gas-distribution plate 12 ascends, in the reaction vessel 11b below the narrowed part 14, also along the surface of the inner wall 17b of the narrowed part member 14a, thereby allowing the fluidizing particles to stably suspend not only at the central part of the fluidized bed 13, (the area distant from the inner wall surface), but also in the vicinity of the inner wall 17b.

Since the upper face of the fluidized bed 13 is above the narrowed part 14, the gas collected to the narrowed part 14 in the gas flow passage after repeated consolidation of bubbles ascends at the central part of the fluidized bed 13 without re-distributing above the narrowed part. Consequently, above the narrowed part 14 in the gas flow passage, as the gas pushes up mainly the particles at the central part of the fluidized bed, the convection flow of the fluidizing particles peripheral to the central part is generated from the central part of the fluidized bed toward the outer side of the fluidized bed. As a result, the small mass particles among the fluidizing particles can be retained more homogeneously and stably on the upper side than the narrowed part in the gas flow passage.

The unreacted gas passes through the fluidized bed 13, and is discharged from a vent pipe attached to the upper part of the reaction vessel 11b. The discharged gas can be reused by recirculating to the inflow port.

Since the narrowed part member 14a is readily detachable, existing circular cylinder type can be used as the reaction vessel 11b, and the position of the narrowed part member 14a can be adjusted according to the structure of the reaction vessel 11b, the gas inflow velocity, and the like.

In the case of gas-phase polymerization reaction, the gas-phase fluidized-bed reactor 20 in the second embodiment can fully grow fluidizing particles which form the fluidized bed, and the fully grown fluidizing particles flow down by increasing in their mass, and then are discharged from the withdrawal port. As a result, the fluidizing particles can be efficiently and fully grown while suppressing the short pass, thereby being able to produce polymer which has excellent homogeneity in the polymer structure.

(Reaction Vessel)

Concerning the reaction vessel 11b in the embodiment, an existing circular cylindrical type can be used as a reaction vessel. In this case, it is possible that the existing common vertical right circular cylindrical reaction vessel 11b is provided with the narrowed part member 14a on the inner wall surface thereof, thereby fabricating the reactor having the same effect as that of the gas-phase fluidized-bed reactor 10 in the first embodiment described above. Accordingly, since the gas-phase fluidized-bed reactor 20 in the present embodiment can readily be fabricated using the existing reaction vessel, the gas-phase fluidized-bed reactor 20 is more effective in terms of producing cost than the gas-phase fluidized-bed reactor 10 related to the first embodiment.

At the inner side of the reaction vessel 11b, the narrowed part member 14a is installed. The narrowed part member 14a has a shape having the narrowed part 14 at a specified position in the gas flow passage above the gas-distribution plate 12. The shape of the narrowed part member 14a is not specifically limited if it can be installed in the reaction vessel 11b and the gas flow passage has the narrowed part 14. For example, when the narrowed part member is installed in the circular cylindrical reaction vessel 11b, the shape of gas flow passage formed by the circular cylindrical reaction vessel 11b and the narrowed part member becomes that in the reaction vessel given in FIG. 2. The narrowed part member 14a is required only to position at least a part inside of the reaction vessel 11b. The narrowed part member 14a, however, preferably has a narrowed annular shape. In this case, the gas entering from the gas-distribution plate 12 can retain the small mass particles among the fluidizing particles mainly above the narrowed part in the gas flow passage further homogeneously and stably, and can retain the large mass particles among the fluidizing particles mainly below the narrowed part in the gas flow passage further stably.

Since the narrowed part member 14a is readily detachable, the position of the narrowed part member 14a can be adjusted according to the structure of the reaction vessel 11b, the gas inflow velocity, and the like.

The narrowed part member 14a may have a structure that has plurality of narrowed parts in the gas flow passage, and plurality of narrowed part member 14a may be positioned in the reaction vessel 11b so as the gas flow passage to have plurality of narrowed parts. When plurality of narrowed parts 14 are applied, the upper face of the fluidized bed is required only to be above the lowermost narrowed part 14.

According to the embodiment, the narrowed part member 14a is positioned along the inner wall surface of the reaction vessel so as the gas flow passage above the gas-distribution plate 12 to have the narrowed part at a specified position. As the gas flow passage has the narrowed part 14, the gas entering from the gas-distribution plate 12 ascends also along the inner wall 17b of the narrowed part member 14a in the gas flow passage below the narrowed part 14, thereby allowing the fluidizing particles to suspend stably not only in the central part of the fluidized bed 13, (the zone distant from the inner wall), but also in the vicinity of the surface of the inner wall 17b stably.

The fluidized bed is formed in the gas flow passage. The fluidized bed is formed in the area from below the narrowed part 14 to above the narrowed part 14. In the zone above the narrowed part 14 in the gas flow passage, since the gas pushes up mainly the fluidizing particles in the central part of the fluidized bed, the fluidizing particles peripheral to the central part create convection flow from the central part toward outer zone therefrom. As a result, for the case of gas-phase polymerization, small mass fluidizing particles such as the introduced polymerization catalyst and the polymer particles which are not fully grown can be retained above the narrowed part 14 further homogeneously and stably, and the fluidizing particles can efficiently and fully be grown.

The gas-distribution plate 12 is preferably in a circular disk shape, and the narrowed part member 14a and the gas-distribution plate 12 are preferably positioned coaxially each other. When the narrowed part member 14a is in the described state above, the gas entering from the gas-distribution plate can retain the small mass particles among the fluidizing particles mainly above the narrowed part in the gas flow passage further homogeneously and stably, and can retain the large mass particles among the fluidizing particles mainly below the narrowed part in the gas flow passage further stably. Also from the point of construction of the reactor, the above arrangement is preferred.

The inner diameter of the gas-distribution plate 12 and the inner diameter of the reaction vessel 11b at the bottom face thereof are preferably almost the same each other. In other words, the reaction vessel and the gas-distribution plate are preferably designed so as the gas passed through the gas-distribution plate 12 to uniformly spread over the inside area of the reaction vessel.

A preferable cross sectional area of the gas flow passage at the narrowed part is 0.1 to 0.95 times that of the gas flow passage at the lowermost face (at the position of gas-distribution plate 12), more preferably 0.2 to 0.8 times, and most preferably 0.3 to 0.6 times. If the cross sectional area of the gas passage at that position is below 0.1 times that of the gas flow passage at the lowermost face, the gas velocity at the narrowed part becomes excessively large, which may significantly increase the scattering of fluidizing particles outside the reaction vessel. If the cross sectional area thereof exceeds 0.95 times, the homogeneous mixing of the fluidizing particles in the fluidized bed is enhanced, which may likely induce short pass.

When the height from the gas-distribution plate to the upper face of the fluidized bed is expressed by H, the narrowed part, (the lowermost narrowed part in case of plurality of narrowed parts), is preferably in the range of 0.1H to 0.9H above the gas-distribution plate, more preferably 0.3H to 0.8H, and most preferably 0.3H to 0.7H. If the narrowed part is positioned at a height below 0.1H from the gas-distribution plate, or at a height of 0.9H or more therefrom, short path may likely be caused.

As illustrated in FIG. 3, when used as the polymerization reaction vessel, the reaction vessel 11b in the present embodiment has a introduction port 15 to introduce the polymerization catalyst into the reaction vessel 11b, and a withdrawal port 16 to withdraw the fluidizing particles generated by the gas-phase polymerization of the reaction gas therefrom.

The introduction port 15 is preferably positioned between the narrowed part 14 in the gas flow passage and the upper face of the fluidized bed, and the withdrawal port 16 is preferably positioned below the narrowed part 14 in the gas flow passage.

Since the introduction port 15 to introduce the polymerization catalyst is positioned above the narrowed part 14, the small mass particles such as the introduced polymerization catalyst and the polymer particles which are not fully grown can be suppressed from falling down to lower zone of the fluidized bed. As a result, the gas-phase fluidized-bed reactor 20 of the embodiment can further surely suppress the short pass, and the introduced polymerization catalyst can fully be functioned. In addition, since the withdrawal port 16 is positioned below the narrowed part 14, the fully grown fluidizing particles can readily and surely be withdrawn from the withdrawal port 16.

The gas-phase fluidized-bed reactor according to the present invention is applicable not only to the single vessel polymerization process which uses only one reactor but also to the multi-vessel polymerization process which arranges more than one reactor in series. In the case of multi-vessel polymerization process, any one of the reactors arranged in series is required to be the gas-phase fluidized-bed reactor according to the present invention, and other reactors may be other type of reactor. Applicable reactor which is used in combination with the gas-phase fluidized-bed reactor according to the present invention includes bulk polymerization reactor, slurry polymerization reactor, and solution polymerization reactor other than the gas-phase fluidized-bed reactor. The bulk polymerization process conducts polymerization utilizing a medium of liquid olefin such as propylene. The slurry polymerization process and the solution polymerization process conduct polymerization in an inert hydrocarbon solvent such as propane, butane, isobutene, pentane, hexane, heptane, and octane.

In the case of the above multi-vessel polymerization process, the not fully grown fluidizing particles transferred from preceding vessel to the gas-phase fluidized-bed reactor of the present invention can be used instead of the polymerization catalyst.

Although the fluidized bed according to the present invention is the gas-solid fluidized bed, existence of liquid in the fluidized bed raises no problem if the quantity of the liquid is small, below 10% to the gas volume in the reactor. Even under the condition, the gas-phase fluidized-bed reactor according to the present invention exhibits the fluidization of the gas-solid fluidized bed.

Concerning the reaction vessel of the present invention, there can be mounted an enlarged part at the upper portion of the reaction vessel or an agitation blade.

Third Embodiment

Figure 4:
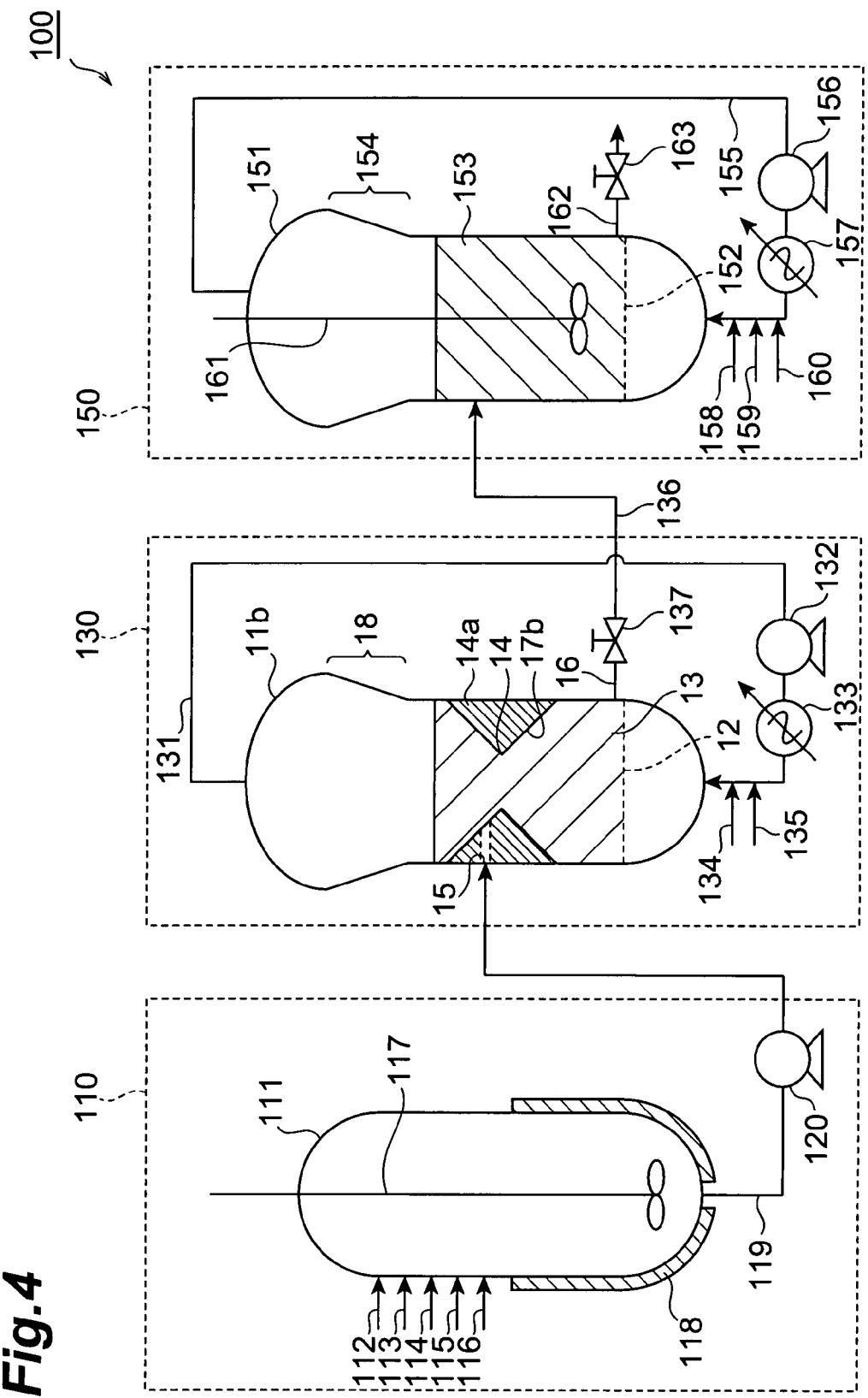
FIG. 4 shows rough sketch of a preferred embodiment of the multi-vessel polymerization system according to the present invention.

Next, a multi-vessel polymerization system 100 according to the third embodiment of the present invention is described in detail referring to FIG. 4.

The multi-vessel polymerization system 100 shown in FIG. 4 has a structure of three polymerization reactor 110, 130, and 150 in series via the respective transfer lines 119 and 136.

As of these three polymerization reactor 110, 130, and 150, the polymerization reactor 110 at the most upstream position is a bulk polymerization reactor to polymerize the first olefin (such as propylene). To a reaction vessel 111 in the polymerization reactor 110, there are supplied continuously a polymerization catalyst via a polymerization catalyst introduction line 112, an alkyl aluminum compound via an alkyl aluminum compound introduction line 113, an organic silicon compound via an organic silicon compound introduction line 114, the first olefin via an olefin introduction line 115, and hydrogen via a hydrogen introduction line 116, thus the polymerization of the first olefin being conducted.

The reaction vessel 111 has an agitator 117, thereby the contents of the reaction vessel 111 can be agitated during the polymerization of the first olefin. Outer wall of the reaction vessel 111 is covered with a jacket 118, and the reaction heat generated by the polymerization of the first olefin is removed by the jacket 118.

Although the reaction condition of the bulk polymerization in the polymerization reactor 110 is not specifically limited, the polymerization temperature is normally in the range of 40° C. to 120° C., preferably 50° C. to 90° C., and the polymerization pressure is normally in the range of 1 to 100 MPa, preferably 5 to 40 MPa.

At the lower part of the reaction vessel 111, the transfer line 119 having a transfer pump 120 is provided, and through the transfer line 119 the reaction product (polymer particles containing polymerization catalyst) in the reaction vessel 111 is transferred to the polymerization reaction apparatus 130.

The polymerization reaction apparatus 130 is the gas-phase fluidized-bed reactor of the present invention, and the basic structure is similar to that of the gas-phase fluidized-bed reactor 20 shown in FIG. 3. The polymerization reactor 130, however, further has a circulation line 131. The circulation line 131 contains a circulation compressor 132 and a heat exchanger 133. The upstream end of the circulation line 131 is connected to the top of the reaction vessel 11b, and the downstream end thereof is connected to the bottom of the reaction vessel 11b. In addition, an olefin introduction line 134 and a hydrogen introduction line 135 are connected to the circulation line 131 between the heat exchanger 133 and the reaction vessel 11b.

The reaction vessel 11b in the polymerization reactor 130 has an enlarged part 18 above the fluidized bed 13. The gas flow passage formed in the enlarged part 18 plays a role of deceleration zone to reduce the velocity of gas leaving the fluidized bed 13 before being discharged from the reaction vessel 11b into the circulation line 131. The reaction vessel 11b shown in FIG. 4 has a structure that the cross sectional area of gas flow passage parallel to the gas-distribution plate 12 monotonously increases above the fluidized bed 13 in the direction of gas flow. However, the shape of the enlarged part 18 is not specifically limited if only the above-deceleration zone is formed.

According to the polymerization reactor 130, the polymer particles containing polymer catalyst, coming from the polymerization reactor 110, are continuously introduced into the reaction vessel 11b via the introduction port 15. There are introduced the first olefin via the olefin introduction line 134 and hydrogen via the hydrogen introduction line 135 to the reaction vessel 11b, which are blown upward via the gas-distribution plate 12, thus the fluidized bed 13 of the polymer particles containing polymerization catalyst being formed and the polymerization of the first olefin being conducted.

The gas passing through the fluidized bed 13 reduces its velocity in the gas flow passage formed in the enlarged part 18 (deceleration zone), and then is discharged from the top of the reaction vessel 11b via the circulation line 131. The discharged gas circulates through the circulation line 131 by the circulation compressor 132, and then finally is blown into the reaction vessel 11b from the bottom thereof, after the polymerization reaction heat is removed by the heat exchanger 133. When the discharged gas is blown into the reaction vessel 11b, the supply of the first olefin from the olefin introduction line 134 and the supply of hydrogen from the hydrogen introduction line 135 can be continuously performed.

The withdrawing port 16 of the reaction vessel 11b is provided with the transfer line 136 equipped with a valve 137, while the other end of the transfer line 136 is connected with a reaction vessel 151 of a polymerization-reactor 150. The fluidizing particles are withdrawn from the withdrawing port 16 utilizing the pressure difference between the reaction vessel 11b and the reaction vessel 151, and then introduced into the reaction vessel 151 through the transfer line 136. Opening and closing of the valve 137 is performed to withdraw the fluidizing particles so that the height of the upper face of the fluidized bed becomes almost constant.

As of the three polymerization reactor 110, 130, and 150, the polymerization reactor 150 at most downstream position is a circular cylindrical gas-phase fluidized-bed reactor, which is one different from gas-phase fluidized-bed reactor according to the present invention in that the gas flow passage in the reaction vessel 151 does not have narrowed part. Installation of a gas-distribution plate 152 at the lower part of the reaction vessel 151 and having an enlarged part 154 above the fluidized bed 13 in the reaction vessel 151 are the same as those of the polymerization reactor 130.

The polymerization reactor 150 has a circulation line 155. The upstream end of the circulation line 155 is connected to the top of the reaction vessel 151, and the downstream end thereof is connected to the bottom of the reaction vessel 151. The circulation line 155 has a circulation compressor 156 and a heat exchanger 157. In addition, the first olefin introduction line 158, the second olefin introduction line 159, and a hydrogen introduction line 160 are respectively connected to the circulation line 155 between the heat exchanger 157 and the reaction vessel 151.

The polymerization reactor 150 has an agitator 161 to assist the flow of fluidizing particles in the reaction vessel 151.

In the polymerization reactor 150, the fluidizing particles are intermittently introduced from the polymerization reactor 130 into the reaction vessel 151. The first olefin from the first olefin introduction line 158, the second olefin (such as ethylene) from the second olefin introduction line 159, and hydrogen from the hydrogen introduction line 160, were respectively introduced into the reaction vessel 151 upward via the gas-distribution plate 152, thus the fluidized bed 153 of the polymer particles containing polymerization catalyst being formed and the polymerization of the first and second olefins being conducted.

The gas passing through the fluidized bed 153 decreases the velocity in the gas flow passage formed in the enlarged portion 154, (deceleration zone), and then are discharged from the top of the reaction vessel 151 into the circulation line 155. The discharged gas circulates in the circulation line 155 driven by the circulation compressor 156, and is removed the polymerization reaction heat in the heat exchanger 157, and finally is blown into the reaction vessel 151 from the bottom thereof. When the discharged gas is blown into the reaction vessel 151, the supply of the first olefin from the first olefin introduction line 158, the supply of the second olefin from the second olefin introduction line 159, and the supply of hydrogen from the hydrogen introduction line 160 can be continuously performed.

Although the reaction condition of the gas-phase polymerization in the polymerization reactor 150 is not specifically limited, the polymerization temperature is normally in the range of 0° C. to 120° C., preferably 20° C. to 100° C., and the polymerization pressure is normally in the range of 0.1 (normal pressure) to 10 MPa, preferably 0.1 to 8.0 MPa.

A product discharge line 162 having a valve 163 is connected to the lower part of the reaction vessel 151. The target olefin polymer particles generated in the polymerization reactor 150 are discharged from the product discharge line 162. The gas-phase polymerization in the polymerization reactor 150 is conducted with valve 163 closed until the olefin polymer particles fully grow. After that, opening and closing of the valve 163 is performed to withdraw the olefin polymer particles so that the height of the upper face of the fluidized bed becomes almost constant.

[Manufacture of Propylene Copolymer by Multi-Stage Polymerization]

Following is the description of an example of above multi-vessel polymerization process using the gas-phase fluidized-bed reactor according to the present invention. The example is for the process for producing propylene copolymer by two-stage polymerization, in which the content of monomer unit comprised of the polymer component generated in the preceding stage of polymerization process and the content of monomer unit comprised of the polymer component generated in the subsequent stage of polymerization process differ from each other, (the propylene copolymer produced by two-stage polymerization is referred to as the "A-B type polypropylene block copolymer" in some cases). In the following description, the preceding stage of polymerization process is referred to as the "first polymerization process", and the subsequent stage of polymerization process is referred to as the "second polymerization process" for convenience.

According to the process for producing A-B type polypropylene block copolymer, the gas-phase fluidized-bed reactor of the present invention may be applied to only one of the first and the second polymerization processes, or applied to both of the first and the second polymerization processes.

On the condition that the content of the total monomer unit of the polymer component is 100% by mass, the first polymerization process produces the polymer component with the content of the monomer unit of 96% by mass or more based on propylene. If the content of the monomer unit based on the propylene is excessively small, the adhesion resistance of fluidizing particles may deteriorate.

In the first polymerization process, homopolymerization of propylene or copolymerization of propylene and other monomer except propylene can be conducted. The monomer except propylene includes $C_2$-$C_8$ olefins (always excepting propylene) such as ethylene, 1-butene, 1-hexene, and 1-octene. The olefins can be used separately or in combination of two or more. A preferable polymer component produced by the first polymerization process includes propylene homopolymer and propylene-ethylene copolymer.

When the second polymerization process uses the gas-phase fluidized-bed reactor of the present invention, the polymerization process of the first polymerization process is not specifically limited, and any of bulk polymerization process, solution polymerization process, slurry polymerization process, and gas-phase polymerization process can be applied. Those polymerization processes can be applied by plurality of reactors. Alternatively, those polymerization processes may be arbitrarily combined, or may be operated by any of batchwise, semi-batchwise, or continuous mode. In the first polymerization process, the polymerization temperature is in the range of 0° C. to 120° C., preferably 20° C. to 100° C., and the polymerization pressure is in the range of normal pressure to 10 MPa, preferably 0.1 to 8.0 MPa. To adjust the molecular weight of the polymer, a chain-transfer agent such as hydrogen can be used.

On the condition that the content of the total monomer unit of the polymer component is 100% by mass, the second polymerization process produces the polymer component with the content of the monomer unit of 65 to 90% by mass based on propylene. If the content of the monomer unit based on the propylene is below 65% by mass, the adhesion resistance of fluidizing particles may deteriorate compared with the cases of the above range. If the content thereof exceeds 90% by mass, the impact resistance of the propylene-based polymer may deteriorate. The above range is preferably from 70 to 85% by mass, and more preferably from 75 to 80% by mass.

The monomer other than propylene used in the second polymerization process includes $C_2$-$C_8$ olefins (always excepting propylene) such as ethylene, 1-butene, 1-hexene, and 1-octene. In the second polymerization process, the olefins can be used separately or in combination of two or more. A preferable monomer other than propylene is ethylene.

When the first polymerization process uses the gas-phase fluidized-bed reactor of the present invention, the polymerization process in the second polymerization process is not specifically limited, and any of bulk polymerization process, solution polymerization process, slurry polymerization process, and gas-phase polymerization process can be applied. Those polymerization processes can be applied by plurality of reactors. Alternatively, those polymerization processes may be arbitrarily combined, or may be operated by any of batchwise, semi-batchwise, or continuous mode. A preferred polymerization process for the second polymerization process is gas-phase polymerization process. When the polymerization process in the second polymerization process is gas-phase polymerization process, the second polymerization process may use the gas-phase fluidized-bed reactor according to the present invention, or may use gas-phase fluidized-bed reactors other than the gas-phase fluidized-bed reactor of the present invention if the first polymerization process uses the gas-phase fluidized-bed reactor of the present invention.

In the second polymerization process, the polymerization temperature is in the range of 0° C. to 120° C., preferably 20° C. to 100° C., and the polymerization pressure is in the range of normal pressure to 10 MPa, preferably 0.1 to 8.0 MPa. To adjust the molecular weight of the polymer, a chain-transfer agent such as hydrogen can be used.

As described above, the multi-vessel polymerization process using the gas-phase fluidized-bed reactor of the present invention can also produce the multi-stage polymerized propylene copolymer which has both the crystalline propylene-based polymer portion and the amorphous propylene-based polymer portion. Owing to the excellent heat resistance, rigidity, and impact resistance, the multi-stage polymerized propylene copolymer can be applied to varieties of automobile parts such as bumper and door-trim and to different varieties of packaging containers such as those for retort food.

EXAMPLES

The present invention is described in detail in the following based on Examples and Comparative Examples. The present invention, however, is not limited to those Examples.

[Particles]

In the examples, there was used polypropylene powder (hereinafter referred to as the "PP powder") as the fluidizing particles.

(PP Powder A)

As PP powder A, there were used a PP powder having 1120 μm in mean particle size, 250 μm in minimum particle size, and 2060 μm in maximum particle size.

(PP Powder B)

As PP powder B, there were used a PP powder having 100 μm in mean particle size, 12 μm in minimum particle size, and 206 μm in maximum particle size.

[Fluidized-Bed Reactor]

In the examples, there was used the reactors A to E, described below. Each of the reactors A to E has the gas-distribution plate at the lowest part thereof. The gas-distribution plate has 78 mm in plate diameter, 47.8 cm² in plate area, 37 in the number of holes, 2.5 mm in hole diameter, and square arrangement of each holes per 10 mm spacing in hole arrangement.

(Reactor A)

Figure 5:
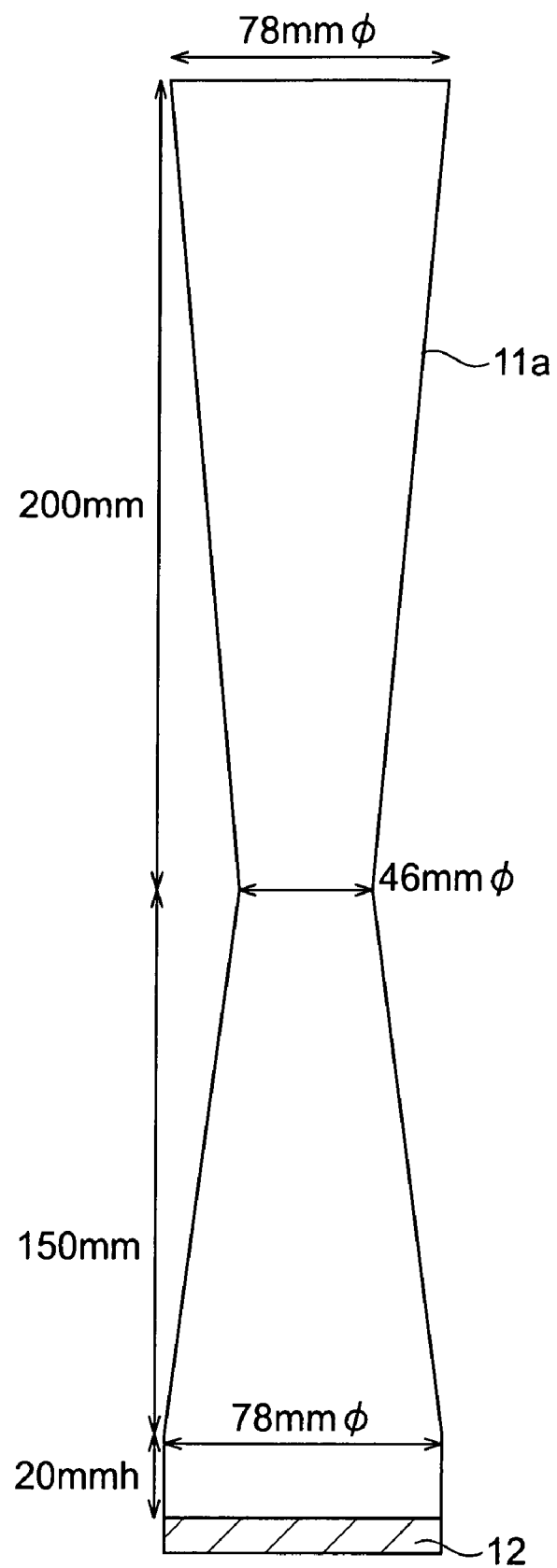
FIG. 5 is a schematic sectional view of reactor A of an example according to the present invention.

The reactor A is one having a narrowed part as illustrated in FIG. 5. The reactor A has the gas distribution plate at the lower part thereof. The reaction vessel has a structure of: 78 mm in bottom diameter, 170 mm in height from the bottom to the narrowed part, 46 mm in inner diameter of the narrowed part, 200 mm in height from the narrowed part to the upper end thereof, and 78 mm in inner diameter at the upper end thereof, giving 16.6 cm² in cross sectional area of the gas flow passage at the narrowed part.

(Reactor B)

Figure 6:
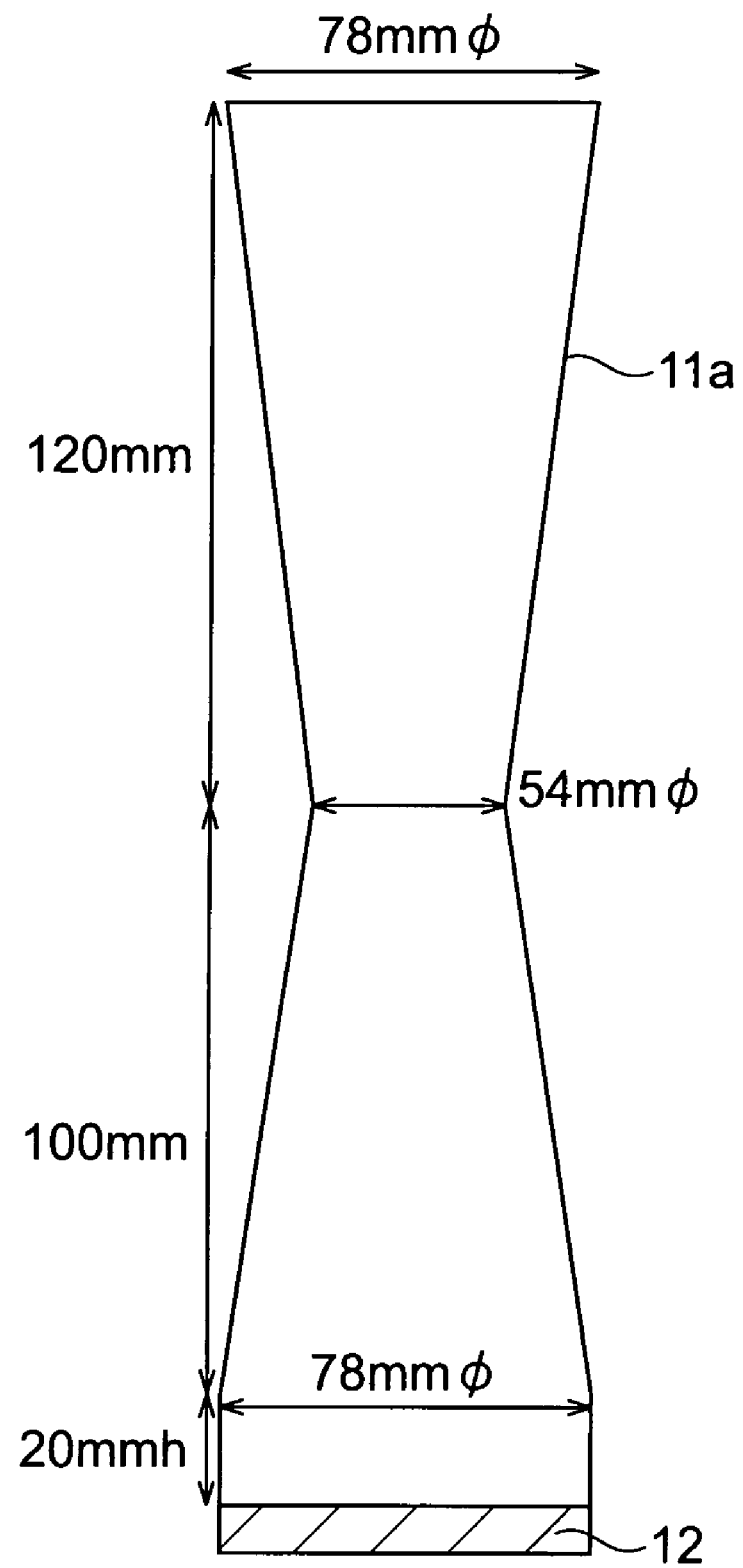
FIG. 6 is a schematic sectional view of reactor B of an example according to the present invention.

The reactor B is one having a narrowed part as illustrated in FIG. 6. The reactor B has the gas-distribution plate at the lower part thereof. The reaction vessel has a structure of: 78 mm in bottom diameter, 120 mm in height from the bottom to the narrowed part, 54 mm in inner diameter of the narrowed part, 120 mm in height from the narrowed part to the upper end thereof, and 78 mm in inner diameter at the upper end thereof, giving 22.9 cm² in cross sectional area of the gas flow passage at the narrowed part.

(Reactor C)

Figure 7:
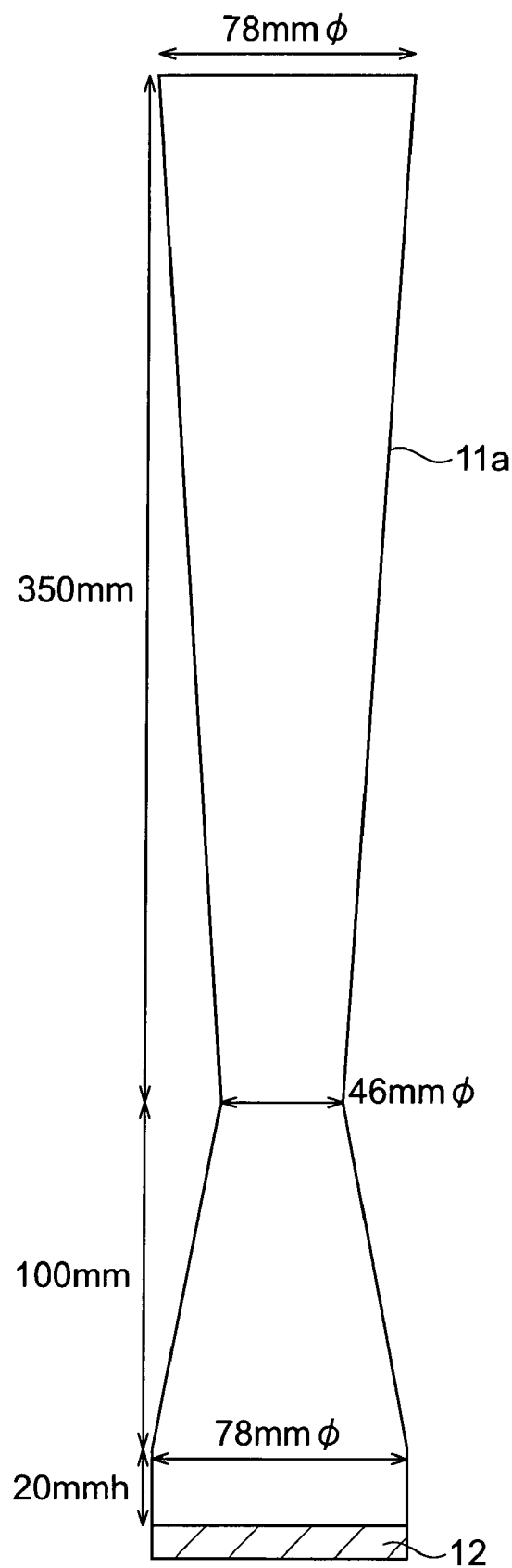
FIG. 7 is a schematic sectional view of reactor C of an example according to the present invention.

The reactor C is one having a narrowed part as illustrated in FIG. 7. The reactor C has the gas-distribution plate at the lower part thereof. The reaction vessel has a structure of: 78 mm in bottom diameter, 120 mm in height from the bottom to the narrowed part, 46 mm in inner diameter of the narrowed part, 350 mm in height from the narrowed part to the upper end thereof, and 78 mm in inner diameter at the upper end thereof, giving 16.6 cm² in cross sectional area of the gas flow passage at the narrowed part.

(Reactor D)

Figure 8:
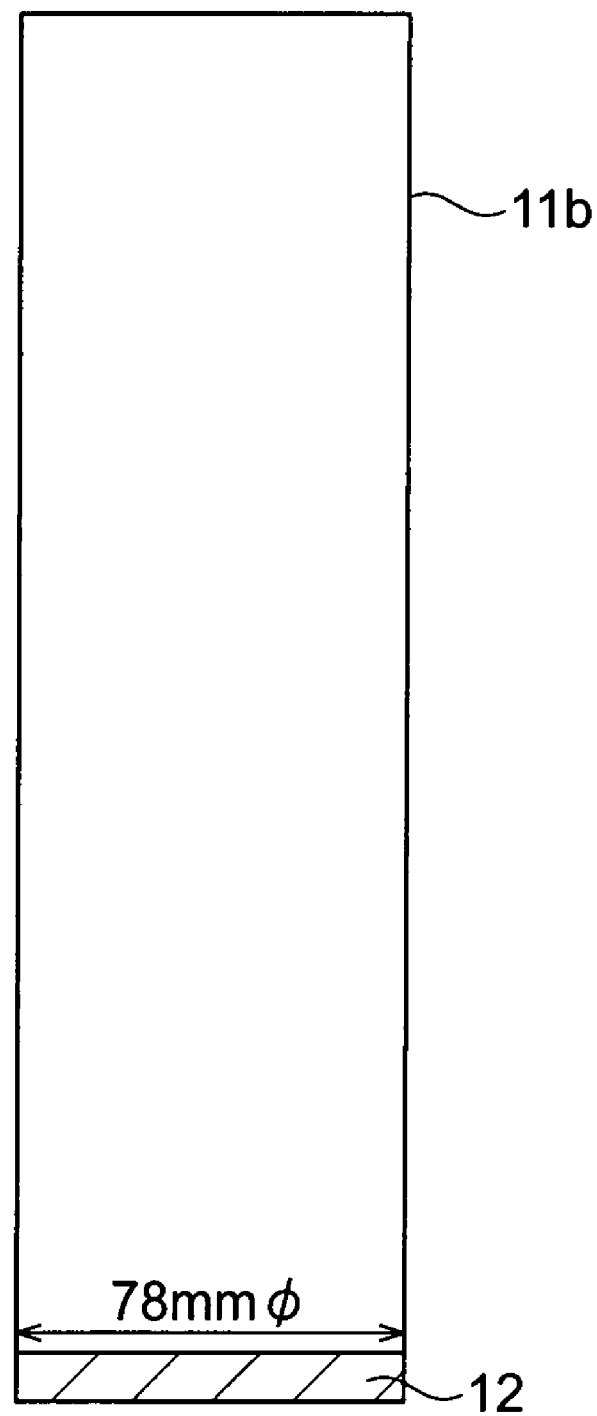
FIG. 8 is a schematic sectional view of reactor D of an example according to the present invention.

The reactor D is a vertical right circular cylindrical reactor as illustrated in FIG. 8. The reactor D has the gas-distribution plate at the lower part thereof. The reaction vessel has a structure of 78 mm in inner diameter and 320 mm in height.

(Reactor E)

Figure 9:
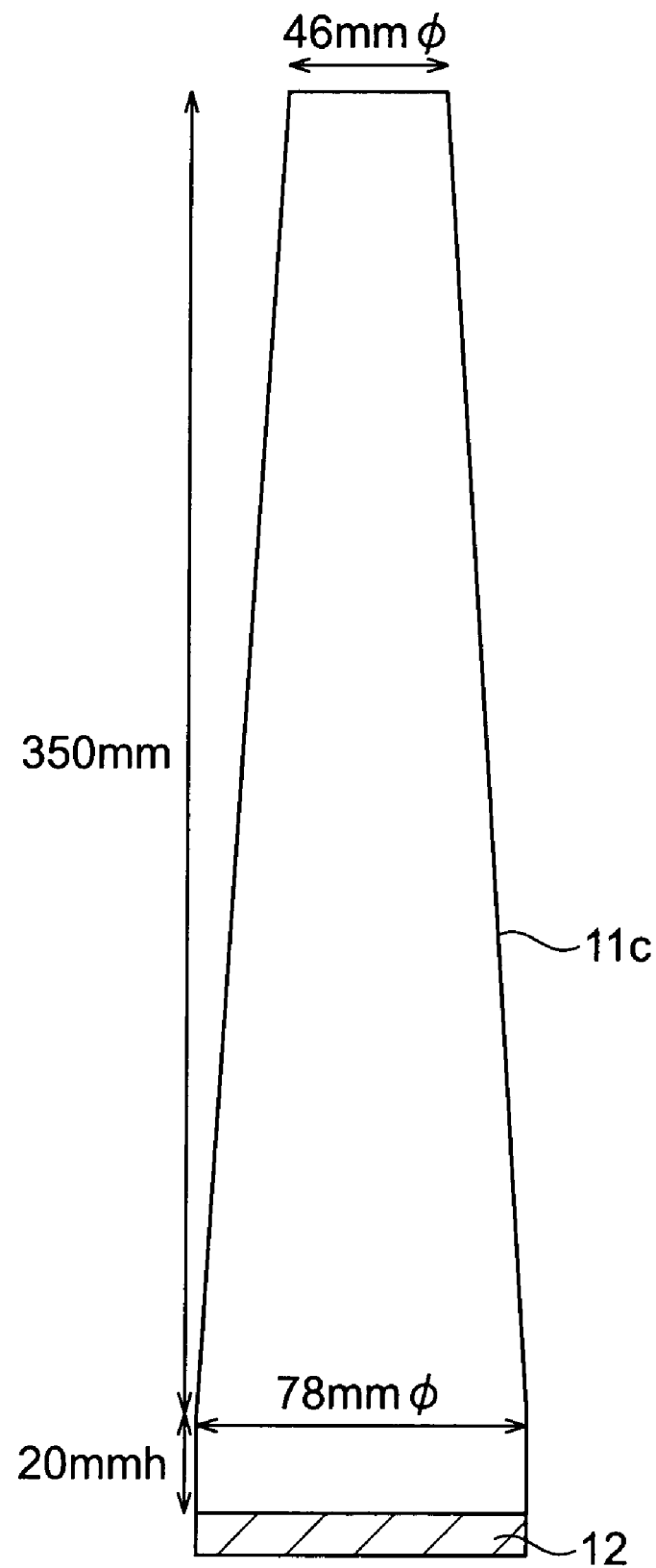
FIG. 9 is a schematic sectional view of reactor E of an example according to the present invention.

The reactor E is one having a shape of right frustum of circular cone, as illustrated in FIG. 9. The reaction vessel E has the gas-distribution plate at the lower part thereof. The reaction vessel has a structure of: 78 mm in bottom inner diameter, 370 mm in height from bottom to top, and 46 mm in top inner diameter.

Example 1

To the reactor A, 250 g of the particle A was charged. A dry nitrogen gas was introduced into the reaction vessel through the gas-distribution plate at a gas velocity of 26.8 cm/s (the velocity at the gas-distribution plate), thereby forming the fluidized bed. The formed fluidized bed had 270 mm in height and 30.2 cm² in top area. After maintained the fluidized bed for 10 minutes, the introduction of dry nitrogen gas was stopped, and the particles in the reaction vessel were measured using the following-described methods. The applied dry nitrogen gas was at normal temperature and normal pressure, giving a minimum fluidization velocity of 22.8 cm/s.

Example 2

The same procedure to Example 1 was applied except that the gas velocity was set to 29.2 cm/s. The height of the formed fluidized bed was 310 mm, and the top area of the fluidized bed was 36.7 cm².

Example 3

The same procedure to Example 1 was applied except that the gas velocity was set to 34.0 cm/s. The height of the formed fluidized bed was 360 mm, and the top area of the fluidized bed was 45.8 cm².

Example 4

The same procedure to Example 1 was applied except that the reactor B was used instead of the reactor A, and that the gas velocity was set to 27.1 cm/s. The height of the formed fluidized bed was 210 mm, and the top area of the fluidized bed was 40.7 cm².

Example 5

The same procedure to Example 4 was applied except that the gas velocity was set to 33.2 cm/s. The height of the formed fluidized bed was 230 mm, and the top area of the fluidized bed was 45.4 cm².

Example 6

The same procedure to Example 1 was applied except that the reactor C was used instead of the reactor A, and that the gas velocity was set to 26.6 cm/s. The height of the formed fluidized bed was 330 mm, and the top area of the fluidized bed was 33.4 cm².

Comparative Example 1

The same procedure to Example 1 was applied except that the reactor D was used instead of the reactor A, and that the gas velocity was set to 26.9 cm/s. The height of the formed fluidized bed was 150 mm, and the top area of the fluidized bed was 47.8 cm².

Comparative Example 2

The same procedure to Example 1 was applied except that the reactor E was used instead of the reactor A, and that the gas velocity was set to 27.9 cm/s. The height of the formed fluidized bed was 190 mm, and the top area of the fluidized bed was 30.6 cm².

Example 7

To the reactor B, there were charged, from the lower part to the upper part, 200 g of Particle A, 10 g of Particle B, and 40 g of Particle A in this order. Dry nitrogen gas was introduced into the reaction vessel through the gas-distribution plate at a gas velocity of 29.3 cm/s (the velocity at the gas-distribution plate), thereby forming the fluidized bed. The formed fluidized bed had 220 mm in height and 43.0 cm² of top area. After maintained the fluidized bed for one minute, the introduction of dry nitrogen gas was stopped, and the particles in the reaction vessel were measured using the following-described methods.

Example 8

The same procedure to Example 7 was applied except that the reactor A was used instead of the reactor B, and that the gas velocity was set to 27.1 cm/s. The height of the formed fluidized bed was 270 mm, and the top area of the fluidized bed was 30.2 cm².

Example 9

The same procedure to Example 7 was applied except that the reactor C was used instead of the reactor B, and that the gas velocity was set to 26.4 cm/s. The height of the formed fluidized bed was 330 mm, and the top area of the fluidized bed was 33.4 cm². The charged position of Particle B was about 50 mm above the narrowed part in the gas flow passage.

Example 10

To the reactor C, there were charged, from the lower part to the upper part, 120 g of Particle A, 10 g of Particle B, and 120 g of Particle A in this order. Dry nitrogen gas was introduced into the reaction vessel through the gas-distribution plate at a gas velocity of 26.2 cm/s (the velocity at the gas-distribution plate), thereby forming the fluidized bed. The formed fluidized bed had 330 mm in height and 33.4 cm² in top area. The charged position of Particle B was about 50 mm below the narrowed part in the gas flow passage.

Comparative Example 3

The same procedure to Example 7 was applied except that the reactor D was used instead of the reactor B, and that the gas velocity was set to 30.3 cm/s. The height of the formed fluidized bed was 160 mm, and the top area of the fluidized bed was 47.8 cm².

Comparative Example 4

The same procedure to Example 7 was applied except that the reactor E was used instead of the reactor B, and that the gas velocity was set to 26.9 cm/s. The height of the formed fluidized bed was 180 mm, and the top area of the fluidized bed was 31.6 cm².

[Evaluation Methods]

(Small particles percentage ratio) Each powder prepared in Examples 1 to 6 and Comparative Examples 1 and 2 was sampled by an amount of 30 g from the uppermost portion of the powder and 30 g from the lowermost portion of the powder. The particle size distribution of each sampled powder was determined to derive the weight percentage of the particles at 500 μm or smaller. Then, the following formula was used to calculate the small particles percentage ratio. Table 1 shows the result. Higher ratio means that the 500 μm or smaller particles exist more in the upper portion of the powder than in the lower portion thereof.

Small particles percentage ratio=$W_T/W_E$ where $W_T$ is the mass percentage of 500 μm or smaller particles among the particles sampled from the uppermost portion of the powder, (% by mass), and $W_E$ is the mass percentage of 500 μm or smaller particles among the particles sampled from the lowermost portion of the powder, (% by mass).

(Determination of Particle Size Distribution)

The determination of particle size distribution of the powder obtained in Example 1 and Comparative Example 1 was given by a laser diffraction particle size distribution meter (HELOS & RODOS System, manufactured by SYMPATEC, INC.). The particle size distribution was determined by dispersing the particles in a dry state, and was expressed by mass-conversion values. Table 2 shows the result.

(Degree of Existence of Fine Particles)

Each powder obtained in Examples 7 to 10 and Comparative Examples 3 and 4 was sampled at a 50 g lot successively from uppermost portion of the powder to the lowermost portion thereof. The sequentially sampled powders were numbered as Fraction 1, Fraction 2, Fraction 3, Fraction 4, and Fraction 5 from the lower sampling position to the upper position.

In Examples 7 to 10 and Comparative Examples 3 and 4, the particle size distribution was determined for Fraction 1 and Fraction 2, and the mass percentage of 250 μm or smaller particles in each fraction was derived, and then the degree of existence of fine particles in each fraction was calculated by the following formula. Table 3 shows the result. A lower degree of existence of fine particles means a smaller quantity of fine particles.

Degree of existence of fine particles=(mass percentage of 250 μm or smaller particles in each fraction)/(mass percentage of 250 μm or smaller particles in the powder)

In Example 7 and Comparative Example 3, the particle size distribution was determined for Fractions 1 to 5, and the same procedure to above was applied to calculate the degree of existence of fine particles in each fraction. Table 4 shows the result.

TABLE 1

| | Reactor | Gas velocity [cm/s] | Bottom area of the fluidized bed [cm²] | Narrowed part area of the fluidized bed [cm²] | Top area of the fluidized bed [cm²] | Height of the fluidized bed [mm] | Small particles percentage ratio |
|---|---|---|---|---|---|---|---|
| Example 1 | A | 26.8 | 47.8 | 16.6 | 30.2 | 270 | 18.4 |
| Example 2 | A | 29.2 | 47.8 | 16.6 | 36.7 | 310 | 8.9 |
| Example 3 | A | 34.0 | 47.8 | 16.6 | 45.8 | 360 | 4.0 |
| Example 4 | B | 27.1 | 47.8 | 22.9 | 40.7 | 210 | 45.7 |
| Example 5 | B | 33.2 | 47.8 | 22.9 | 45.4 | 230 | 9.8 |
| Example 6 | C | 26.6 | 47.8 | 16.6 | 33.4 | 330 | 10.1 |

TABLE 1-continued

| | Reactor | Gas velocity [cm/s] | Bottom area of the fluidized bed [cm²] | Narrowed part area of the fluidized bed [cm²] | Top area of the fluidized bed [cm²] | Height of the fluidized bed [mm] | Small particles percentage ratio |
|---|---|---|---|---|---|---|---|
| Comparative Example 1 | D | 26.9 | 47.8 | — | 47.8 | 150 | 1.7 |
| Comparative Example 2 | E | 27.9 | 47.8 | — | 30.6 | 190 | 2.5 |

TABLE 2

| | Example 1 | | | Comparative Example 1 | | |
|---|---|---|---|---|---|---|
| Particle size (μm) | Upper portion of the fluidized bed (% by mass) | Lower portion of the fluidized bed (% by mass) | Upper portion-lower portion (% by mass) | Upper portion of the fluidized bed (% by mass) | Lower portion of the fluidized bed (% by mass) | Upper portion-lower portion (% by mass) |
| 18 | 0.00 | 0.00 | 0.00 | 0.00 | 0.00 | 0.00 |
| 22 | 0.00 | 0.00 | 0.00 | 0.00 | 0.00 | 0.00 |
| 26 | 0.00 | 0.00 | 0.00 | 0.00 | 0.00 | 0.00 |
| 30 | 0.00 | 0.00 | 0.00 | 0.00 | 0.00 | 0.00 |
| 36 | 0.00 | 0.00 | 0.00 | 0.00 | 0.00 | 0.00 |
| 44 | 0.00 | 0.00 | 0.00 | 0.00 | 0.00 | 0.00 |
| 52 | 0.00 | 0.00 | 0.00 | 0.00 | 0.00 | 0.00 |
| 62 | 0.00 | 0.00 | 0.00 | 0.00 | 0.00 | 0.00 |
| 74 | 0.00 | 0.00 | 0.00 | 0.00 | 0.00 | 0.00 |
| 86 | 0.00 | 0.00 | 0.00 | 0.00 | 0.00 | 0.00 |
| 100 | 0.00 | 0.00 | 0.00 | 0.00 | 0.00 | 0.00 |
| 120 | 0.00 | 0.00 | 0.00 | 0.00 | 0.00 | 0.00 |
| 150 | 0.00 | 0.00 | 0.00 | 0.00 | 0.00 | 0.00 |
| 180 | 0.00 | 0.00 | 0.00 | 0.00 | 0.00 | 0.00 |
| 210 | 0.00 | 0.00 | 0.00 | 0.00 | 0.00 | 0.00 |
| 250 | 0.57 | 0.05 | 0.52 | 0.20 | 0.12 | 0.08 |
| 300 | 1.34 | 0.15 | 1.19 | 0.48 | 0.27 | 0.21 |
| 360 | 2.67 | 0.27 | 2.40 | 0.93 | 0.50 | 0.43 |
| 420 | 3.83 | 0.21 | 3.62 | 1.23 | 0.68 | 0.55 |
| 500 | 6.65 | 0.14 | 6.51 | 2.07 | 1.33 | 0.74 |
| 600 | 9.98 | 0.68 | 9.30 | 3.56 | 2.99 | 0.57 |
| 720 | 13.09 | 3.51 | 9.58 | 6.45 | 6.45 | 0.00 |
| 860 | 15.21 | 9.72 | 5.49 | 11.05 | 11.81 | −0.76 |
| 1020 | 15.50 | 17.38 | −1.88 | 16.01 | 17.26 | −1.25 |
| 1220 | 14.82 | 24.35 | −9.53 | 20.69 | 21.91 | −1.22 |
| 1460 | 10.73 | 23.52 | −12.79 | 19.87 | 20.30 | −0.43 |
| 1740 | 5.05 | 14.99 | −9.94 | 13.29 | 12.79 | 0.05 |
| 2060 | 0.56 | 5.03 | −4.47 | 4.17 | 3.59 | 0.58 |
| 2460 | 0.00 | 0.00 | 0.00 | 0.00 | 0.00 | 0.00 |
| 2940 | 0.00 | 0.00 | 0.00 | 0.00 | 0.00 | 0.00 |
| 3500 | 0.00 | 0.00 | 0.00 | 0.00 | 0.00 | 0.00 |
| Total | 100.00 | 100.00 | | 100.00 | 100.00 | |

TABLE 3

| | Reactor | Gas velocity [cm/s] | Bottom area of the fluidized bed [cm²] | Narrowed part area of the fluidized bed [cm²] | Top area of the fluidized bed [cm²] | Height of the fluidized bed [mm] | Degree of existence of fine particles | |
|---|---|---|---|---|---|---|---|---|
| | | | | | | | Fraction 1 | Fraction 2 |
| Example 7 | B | 29.3 | 47.8 | 22.9 | 43.0 | 220 | 0.00 | 0.44 |
| Example 8 | A | 27.1 | 47.8 | 16.6 | 30.2 | 270 | 0.00 | 0.34 |
| Example 9 | C | 26.4 | 47.8 | 16.6 | 33.4 | 330 | 0.00 | 0.41 |
| Example 10 | C | 26.2 | 47.8 | 16.6 | 33.4 | 330 | 0.08 | 0.77 |
| Comparative Example 3 | D | 30.3 | 47.8 | — | 47.8 | 160 | 0.59 | 0.74 |
| Comparative Example 4 | E | 26.9 | 47.8 | — | 31.6 | 180 | 0.34 | 0.87 |

TABLE 4

| | Degree of existence of fine particles | | | | |
|---|---|---|---|---|---|
| | Fraction 1 | Fraction 2 | Fraction 3 | Fraction 4 | Fraction 5 |
| Example 7 | 0.00 | 0.44 | 1.02 | 1.88 | 1.67 |
| Comparative Example 3 | 0.59 | 0.74 | 0.95 | 1.40 | 1.33 |

As clearly understood in Tables 1 to 4, according to Examples 1 to 10 relating to the gas-phase fluidized-bed reactor of the present invention, it was discovered that the fine particles are easily retained for a long period in a fully mixed state at the upper portion of the bed compared with Comparative Examples 1 to 4 which did not use the gas-phase fluidized-bed reactor of the present invention. Consequently, it is clear that the application of the gas-phase fluidized-bed reactor of the present invention to gas-phase polymerization allows the introduced polymerization catalyst to be retained in a fully mixed state in the fluidized bed above the narrowed part of the reactor, and suppresses the short pass of polymer particles (fluidizing particles) which is not fully grown. Therefore, when the gas-phase fluidized-bed reactor of the present invention is applied to olefin polymerization, for example, physical properties of polypropylene-block copolymer or productivity thereof can be improved.

Example 11 and Comparative Example 5

Produce of Propylene Copolymer by Multistage Polymerization

In the following Examples and Comparative Examples, the fusion heat quantity (J/g) is the value determined by a differential scanning calorimeter (DSC-7, manufactured by Perkin Elmer Co., Ltd.) under the following conditions.
(i) Sample of about 10 mg was heated from 50° C. to 220° C. at a heating speed of 200° C./min, and then was held at 220° C. for 5 minutes.
(ii) Then, the sample was cooled from 220° C. to 180° C. at a cooling speed of 70° C./min, and then was held at 180° C. for 5 minutes.
(iii) Then, the sample was cooled from 180° C. to 50° C. at a cooling speed of 200° C./min, and then was held at 50° C. for 1 minute.
(iv) Then, the sample was heated from 50° C. to 180° C. at a heating speed of 16° C./min.
(v) From the fusion curve drawn in the step (iv), the fusion heat quantity was determined on the basis of a straight line connecting the point of 95° C. and the point where the fusion curve returns to the base line of the temperature-lowering side (the point of about 175° C.).

For the measurement of limiting viscosity (dl/g), a Uberode viscometer was used, with tetrarin as the solvent at 135° C. and concentrations of 0.1, 0.2, and 0.5 g/dl, to determine the reduced viscosity at the respective concentrations. Then, referring to the silicic acid method described in "Polymer Solution: Polymer Experiment II" Kyoritsu Shuppan Co., Ltd. p. 491, (1982), the reduced viscosity was plotted against the concentration, and the extrapolation method to extrapolate the concentration to zero was applied to determine the limiting viscosity.

The content of propylene unit (% by mass) was determined by the infrared absorption spectra method.

The quantity of polymer component $W_a$ (% by mass) generated in the polymerization process (I), described later, and the quantity of polymer component $W_b$ (% by mass) generated in the polymerization process (II), described later, were calculated by the following respective formulae. The polymer generated in the polymerization process (I) signifies the polymer originated from both polymers generated in the polymerization processes (I)-1 and (I)-2, (the same is applied in the following).

$$W_a = (\Delta H_2/\Delta H_1) \times 100$$

$$W_b = 100 - W_a$$

wherein $\Delta H_1$ is fusion heat quantity (J/g) of the polymer after the polymerization process (I), and $\Delta H_2$ is fusion heat quantity (J/g) of the polymer after the polymerization process (II).

The limiting viscosity $[\eta]_a$ (dl/g) of the polymer generated in the polymerization process (I) and the limiting viscosity $[\eta]_b$ (dl/g) of the polymer generated in the polymerization process (II) were calculated from the following respective formulae.

$$[\eta]_a = [\eta]_1$$

$$[\eta]_b = ([\eta]_2 - [\eta]_a \times W_a/100) \times 100/W_b$$

wherein $[\eta]_1$ is the limiting viscosity (dl/g) of the polymer after the polymerization process (I), and $[\eta]_2$ is the limiting viscosity (dl/g) of the polymer after the polymerization process (II).

The content of propylene unit $P_a$ (% by mass) in the polymer generated in the polymerization process (I) and the content of propylene unit $P_a$ (% by mass) in the polymer generated in the polymerization process (II) were calculated by the following respective formulae.

$$P_a = P_1$$

$$P_b = (P_2 - P_a \times W_a/100) \times 100/W_b$$

wherein $P_1$ is the content of propylene unit (% by mass) in the polymer after the polymerization process (I) and $P_2$ is the content of propylene unit (% by mass) in the polymer after the polymerization process (II).

To determine the number of fish-eyes (number/100 cm$^2$), the propylene copolymer produced by multistage polymerization, which was the final reaction product, was formed into a film having a thickness of 80 μm using a T-die film-forming machine (extruder of 20 mm in diameter with 100 mm width T-die, manufactured by Tanabe Plastics Machinery Co., Ltd.) at 200° C. Then, the prepared film image was scanned into a computer using a scanner (manufactured by Seiko Epson Corporation), and image analysis was applied using an image analyzing program (manufactured by Asahi Engineering Co., Ltd.) to determine the number of fish-eyes having 200 μm or larger diameter per 100 cm$^2$.

Example 11

In Example 11, the propylene copolymer by multistage polymerization was produced using the multi-vessel polymerization system having the structure of FIG. 4. The inner volume of the reaction vessel in each polymerization reactor was 40 liter for the reaction vessel 111, 1400 liter for the reaction vessel 11b, and 980 liter for the reaction vessel 151. The narrowed part member 14a of the reaction vessel 11b had the structure of: 50 cm in inner diameter respectively for both the lower bottom and the upper bottom, 51 cm respectively for both the distance of the lower bottom to the narrowed part and of the upper bottom to the narrowed part, and 20 cm in inner diameter of the narrowed part 14. In the reaction vessel 11b, the distance of the lower end of the narrowed part member 14a to the gas-distribution plate 12 was 12 cm.

<Preparation of Preliminary Polymerization-Catalyst Component>

To produce a propylene copolymer by multistage polymerization, the preliminary polymerization-catalyst component was prepared as follows.

(1) Synthesis of Precursor of Solid-Catalyst Component

Internal atmosphere of a SUS autoclave (200 liter of capacity) equipped with an agitator was substituted by nitrogen gas. Then, 54 liter of hexane, 780 g of di-isobutylphthalate, 20.6 kg of tetraethoxysilane, and 2.23 kg of tetrabutoxytitanium were added to the autoclave, and the contents were agitated. To the agitated mixture, 51 liter of dibutylether solution of butylmagnesium chloride, (2.1 mole/l of concentration), was fallen in drops for a period of 4 hours while keeping the temperature in the reaction vessel 111 at 5° C. The agitator 117 was operated at 120 rpm. After the dropping of the solution, the contents were agitated at 20° C. for 1 hour, which was then filtered to obtain a precursor of solid-catalyst component. Thus prepared solid catalyst-component precursor was rinsed with 70 liter of toluene for total three times. Then toluene was added to the solid catalyst-component precursor to obtain slurry of the solid catalyst-component precursor, (hereinafter referred to as "Slurry A").

(2) Synthesis of Solid Catalyst Component

After substituting the internal atmosphere of the SUS autoclave (Inner volume of 200 liter) equipped with an agitator by nitrogen gas, Slurry A prepared by above (1) was added. After the content was allowed to stand, toluene was withdrawn be a Slurry A volume of 49.7 liter. While agitating the contents, a mixed solution of 30 liter of tetrachlorotitanium and 1.16 kg of dibutylether was added to the contents, and further 4.23 kg of orthophthalic acid chloride was added. The contents were agitated for 3 hours at 110° C. of internal temperature of the autoclave, and then the contents were filtered to obtain a solid component. The solid component was rinsed at 95° C. by 90 liter of toluene for total three times. Then toluene was added to the solid component to prepare slurry, (hereinafter referred to as "Slurry B").

Next, Slurry B was returned to the nitrogen-substituted autoclave to allow the contents to leave at rest. After that, toluene was discharged to 49.7 liter of Slurry B volume. While agitating the contents, a mixed solution of 15 liter of tetrachlorotitanium, 1.16 kg of dibutylether, and 0.87 kg of di-isobutylphthalate was added to the contents. The contents were agitated for 1 hour at 105° C. of internal temperature of the autoclave, and then the contents were filtered to obtain a solid component. The solid component was rinsed at 95° C. by 90 liter of toluene for total two times. Then toluene was added to the solid component to prepare slurry, (hereinafter referred to as "Slurry C").

Next, Slurry C was returned to the nitrogen-substituted autoclave to allow the contents to leave at rest. After that, toluene was added to 49.7 liter of Slurry C volume. While agitating the contents, a mixed solution of 15 liter of tetrachlorotitanium and 1.16 kg of dibutylether was added to the contents. The contents were agitated for 1 hour at an internal temperature of 105° C. in the autoclave, and then the contents were filtered to obtain a solid component. The solid component was rinsed at 95° C. by 90 liter of toluene for total two times. Then toluene was added to the solid component to prepare slurry, (hereinafter referred to as "Slurry D").

Next, Slurry D was returned to the nitrogen-substituted autoclave to allow the contents to. After that, toluene was removed to a Slurry A volume of 49.7 liter. While agitating the contents, a mixed solution of 15 liter of tetrachlorotitanium and 1.16 kg of dibutylether was added to the contents to leave at rest. The contents were agitated for 1 hour at 105° C. of internal temperature of the autoclave, and then the contents were filtered to obtain a solid component. The solid component was rinsed at 95° C. by 90 liter of toluene for total two times. Then the solid component was dried to obtain the target solid catalyst component.

(3) Preparation of Preliminary Polymerization Catalyst Component

To a SUS autoclave (Inner volume of 3 liter) equipped with an agitator, there were charged 1.5 liter of fully dehydrated and deaerated n-hexane, 37.5 mmol of triethylaluminum, 3.75 mmol of cyclohexyl ethyldimethoxysilane, and 15 g of above solid catalyst component. While keeping the autoclave temperature at about 10° C., 15 g of propylene was continuously added to the contents for about 30 minutes to conduct the preliminary polymerization. Then, the preliminarily polymerized slurry in the autoclave was transferred to another SUS autoclave (Inner volume of 160 liter) equipped with an agitator, and 145 liter of liquid butane was added to the contents to prepare the slurry of preliminary polymerization catalyst composition.

<Polymerization Process (I)-1>

In the reaction vessel 111 of the multi-vessel polymerization system, there were continuously added propylene, hydrogen, triethyl aluminum, cyclohexylethyl dimethoxysilane, and slurry of preliminary polymerization-catalyst component, and conducted continuous bulk polymerization. The polymerization conditions were: polymerization temperature 70° C., polymerization pressure 4.0 MPaG, the propylene flow 35 kg/h, the hydrogen flow 300 Nliter/h, the triethyl aluminum flow 41 mmol/h, the cyclohexyl ethyldimethoxysilane flow 6.2 mmol/h, and the flow of preliminary polymerization catalyst component 0.79 g/h (as solid catalyst component). The average retention time was 0.24 hours, and the discharge quantity of polymer particles was 3.8 kg/h. The polymer particles obtained in the polymerization process (I)-1 were continuously transferred to the reaction vessel 11b to use in the polymerization process (I)-2.

<Polymerization Process (I)-2>

In the reaction vessel 11b, there were added the polymer particles obtained in the polymerization process (I)-1, propylene, and hydrogen to conduct gas-phase polymerization of propylene. The polymerization conditions were: polymerization temperature 80° C., polymerization pressure 1.8 MPaG, gas velocity at the gas-distribution plate 11.3 cm/s, and the ratio 0.10 of the hydrogen concentration to the sum of the propylene concentration and the hydrogen concentration in the reaction vessel 11b. The introduction port 15 of polymer particles obtained in the polymerization process (I)-1 was positioned at 34 cm above the narrowed part 14. When the fluidized bed was formed in the reaction vessel 11b, the upper face of the fluidized bed was above the narrowed part 14, giving about 150 cm in fluidized bed height and about 50 cm in diameter at the top face of the fluidized bed. In the polymerization process (I)-2, the minimum fluidization velocity was 8.8 cm/s, and the average retention time was set to 4.0 hour. The generated polymer particles were intermittently transferred to the reaction vessel 151 to use in the polymerization process (II).

<Polymerization Process (II)>

In the reaction vessel 151, there were continuously added the polymer particles obtained in the polymerization process (I)-2, propylene, ethylene, and hydrogen to conduct gas-phase polymerization of propylene and ethylene. The polymerization conditions were: polymerization temperature 70° C., polymerization pressure 1.4 MPaG, gas velocity at the gas-distribution plate 19.8 cm/s, the ratio 0.0032 of the hydrogen concentration to the sum of propylene concentration and hydrogen concentration in the reaction vessel 151, and the ratio 0.240 of the ethylene concentration to the sum of propylene concentration and ethylene concentration in the reaction vessel 151. The average retention time was set to 2.6 hours. The target propylene copolymer generated by multistage polymerization was removed intermittently from the product discharge line 162 located at the lower part of the reaction vessel 151.

3.8 hours, while other conditions were the same as those in the polymerization process (I)-2 in Example 11.

<Polymerization Process (II)>

Similar to the polymerization process (II) in Example 11, the gas-phase polymerization of propylene and ethylene was conducted. The ratio of the ethylene concentration to the sum of propylene concentration and ethylene concentration in the reaction vessel 151 was 0.242, while other conditions were the same as those in the polymerization process (II) in Example 11.

Table 5 shows the quantity of polymer component $W_a$ and $W_b$, the limiting viscosity $[\eta]_a$ and $[\eta]_b$, and the respective unit contents of propylene $P_a$ and $P_b$, which were generated by the respective polymerization processes (I) and (II) in Comparative Example 5, and the limiting viscosity of propylene copolymer by multistage polymerization, which is the ultimate reaction product, the unit content of propylene, and the number of fish-eyes.

TABLE 5

|  |  | Example 11 | Comparative Example 5 |
|---|---|---|---|
| Component generated in the polymerizatiom process(I) | Quantity of polymer component $W_a$ (% by mass) | 87.2 | 87.8 |
|  | Limiting viscosity $[\eta]_a$ (dl/g) | 1.0 | 1.0 |
|  | Content of propylene unit $P_a$ (% by mass) | 100 | 100 |
| Component generated in the polymerizatiom process(II) | Quantity of polymer component $W_b$ (% by mass) | 12.8 | 12.2 |
|  | Limiting viscosity $[\eta]_b$ (dl/g) | 5.5 | 5.6 |
|  | Content of propylene unit $P_b$ (% by mass) | 66.4 | 66.2 |
| Final Reaction Product | Limiting viscosity (dl/g) | 1.55 | 1.58 |
|  | Content of propylene unit (% by mass) | 95.7 | 95.9 |
|  | The number of fresh-eyes (number/100 cm$^2$) | 71 | 402 |

Table 5 shows the quantity of polymer component $W_a$ and $W_b$, the limiting viscosity $[\eta]_a$ and $[\eta]_b$, and the respective unit contents of propylene $P_a$ and $P_b$, which were generated by the respective polymerization processes (I) and (II) in Example 11, and the limiting viscosity of propylene copolymer by multistage polymerization, which is the ultimate reaction product, the unit content of propylene, and the number of fish-eyes.

Comparative Example 5

Through the use of a reactor similar to the multi-vessel polymerization system applied in Example 11 except that the narrowed part member 14a was removed from the reaction vessel 11b, the propylene copolymer by multistage polymerization was produced by the following procedure.

<Preliminary Polymerization Process>

Similar to the preliminary polymerization process in Example 11, the continuous bulk polymerization was conducted.

<Polymerization Process (I)-2>

As described above, the narrowed part member was removed from the reaction vessel 11b, and the gas-phase polymerization of propylene was conducted under the same condition as the polymerization process (I)-2 in Example 11. The ratio of the hydrogen concentration to the sum of propylene concentration and hydrogen concentration in the reaction vessel 11b was 0.09, and the average retention was As the result shown in Table 5, in Example 11 relating to the producing process for an olefin polymer according to the present invention, it was confirmed that the number of fish-eyes was satisfactorily decreased. Through the process for producing an olefin polymer according to the present invention, the olefin polymer having excellent external view and impact resistance, and applicable favorably to automobile parts, household electric appliance parts, and the like.

INDUSTRIAL APPLICABILITY

The gas-phase fluidized-bed reactor, the multi-vessel polymerization system, and the process for producing an olefin polymer using the reactor, according to the present invention, allow to produce polymers having excellent homogeneity of polymer structure in gas-phase polymerization.

The invention claimed is:

1. A gas-phase fluidized-bed reactor conducting reaction by feeding a gas, through a gas-distribution plate located at the lower part of a reaction vessel, into a fluidized bed formed on the gas-distribution plate,
   wherein the reaction vessel has a narrowed part member to provide the gas flow passage above the gas-distribution plate with a narrowed part at a specified position,
   wherein the narrowed part member has a continuous surface and forms a continuous wall within the reaction vessel, and wherein the gas-phase fluidized-bed reactor is used so that the fluidized bed is formed in the area from below to above the narrowed part.

2. The gas-phase fluidized-bed reactor according to claim 1, wherein the narrowed part member forms a narrow annular shape, the gas-distribution plate is in a circular disk shape, and the narrowed part member and the gas-distribution plate are coaxially arranged.

3. A process for producing an olefin polymer using the reactor according to claim 1, comprising the steps of:

introducing a reaction gas containing at least one olefin gas into the fluidized bed through the gas-distribution plate so as the upper face of the fluidized bed to be above the narrowed part; and obtaining the olefin polymer by gas-polymerization of the reaction gas.

* * * * *